(12) United States Patent
Macaro et al.

(10) Patent No.: US 11,010,451 B2
(45) Date of Patent: May 18, 2021

(54) TECHNIQUES FOR AUTOMATED BAYESIAN POSTERIOR SAMPLING USING MARKOV CHAIN MONTE CARLO AND RELATED SCHEMES

(71) Applicant: SAS Institute Inc., Cary, NC (US)

(72) Inventors: Christian Macaro, Raleigh, NC (US); Jan Chvosta, Raleigh, NC (US); Mark Roland Little, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 1134 days.

(21) Appl. No.: 14/210,259

(22) Filed: Mar. 13, 2014

(65) Prior Publication Data

US 2014/0278335 A1    Sep. 18, 2014

Related U.S. Application Data

(60) Provisional application No. 61/779,136, filed on Mar. 13, 2013, provisional application No. 61/779,184, filed on Mar. 13, 2013.

(51) Int. Cl.
  *G06F 17/18* (2006.01)
  *G06N 7/00* (2006.01)

(52) U.S. Cl.
  CPC ............. *G06F 17/18* (2013.01); *G06N 7/005* (2013.01)

(58) Field of Classification Search
  CPC .............................. G06F 17/18; G06N 7/005
  See application file for complete search history.

(56) References Cited

U.S. PATENT DOCUMENTS

| 7,072,811 | B2* | 7/2006 | Kadane | G06F 17/18 703/2 |
| 7,409,325 | B2* | 8/2008 | Morara | G06F 17/10 703/2 |
| 2014/0019059 | A1 | 1/2014 | Shankle et al. | |
| 2014/0095616 | A1* | 4/2014 | White | G06Q 50/02 709/204 |

OTHER PUBLICATIONS

Smith, Brian "BOA: An R Package for MCMC Output Convergence Assessment and Posterior Inference" J. Statistical Software, vol. 21, iss. 11 (2007).*

Mnih, Andriy "CSC2535 Appendix to Lecture 4: Introduction to Markov Chain Monte Carlo" (2006) available at <http://www.cs.toronto.edu/~hinton/csc2535_06/notes/lec4b.pdf>.*

(Continued)

*Primary Examiner* — Jay Hann
(74) *Attorney, Agent, or Firm* — Kacvinsky Daisak Bluni PLLC

(57) ABSTRACT

Techniques for automated Bayesian posterior sampling using Markov Chain Monte Carlo and related schemes are described. In an embodiment, one or more values in a stationarity phase for a system configured for Bayesian sampling may be initialized. Sampling may be performed in the stationarity phase based upon the one or more values to generate a plurality of samples. The plurality of samples may be evaluated based upon one or more stationarity criteria. The stationarity phase may be exited when the plurality of samples meets the one or more stationarity criteria. Other embodiments are described and claimed.

27 Claims, 13 Drawing Sheets

(56) References Cited

OTHER PUBLICATIONS

Raftery A., & Lewis S. "How Many Iterations in the Gibbs Sampler?" Bayesian Statistics, vol. 4, chapter (1992) (Year: 1992).*
Gelman, A., & Rubin, D. "Inference from Iterative Simulation Using Multiple Sequences" Statistical Science, vol. 7, No. 4 pp. 457-472 (1992) (Year: 1992).*
Craiu, R., et al. "Learn From Thy Neighbor: Parallel-Chain and Regional Adaptive MCMC" J. American Statistical Association, vol. 104, issue 488, pp. 1454-1466 (2009) (Year: 2009).*
Raftery et al., "One Long Run with Diagnostics: Implementation Strategies for Markov Chain Monte Carlo", Statistical Science, (1992), 5 pages.
Raftery et al., "The Number of Iterations, Convergence Diagnostics, and Generic Metropolis Algorithms", Chapman & Hall, (1995), 15 pages.
Heidelberger et al., "Simulation Run Length Control in the Presence of an Initial Transient", Operations Research, vol. 31, No. 6, pp. 1109-1144, 1983.
Heidelberger et al., "A Spectral Method for Confidence Interval Generation and Run Length Control in Simulations", Simulation Modeling and Statistical Computing, Communications of the ACM, vol. 24, No. 4, Apr. 1981, 13 pages.
Geweke, J. (1992), "Evaluating the Accuracy of Sampling-Based Approaches to Calculating Posterior Moments," Oxford University Press, vol. 4, 1992, 25 pages.
Venables, W. N., "An Introduction to R", <http://cran.r-project.org/doc/manuals/r-release/R-intro.html>, version 3.1.1 (Jul. 10, 2014), 1990 pp. 1-45.
Venables, W. N., "An Introduction to R", <http://cran.r-project.org/doc/manuals/r-release/R-intro.html>, version 3.1.1 (Jul. 10, 2014), 1990 pp. 46-90.
Venables, W. N., "An Introduction to R", <http://cran.r-project.org/doc/manuals/r-release/R-intro.html>, version 3.1.1 (Jul. 10, 2014), 1990 pp. 91-124.
Office Action received for U.S. Appl. No. 14/210,361, dated Jul. 1, 2016, 32 pages.
Sahlin, Kristoffer, "Estimating convergence of Markov chain Monte Carlo simulations", Master Thesis in Mathematical Statistics, published by Mathematics and Statistics Department, Stockholm University, Stockholm , Sweden, Feb. 2011, 38 pages.
Link et al., "On thinning of chains in MCMC", Methods in Ecology and Evolution, vol,. 3, 2012, 4 pages.
Cosma et al., "Principle of Detailed Balance and Convergence Assessment of Markoiv Chain Monte Carlo methods and Simulated Annealing", arXiv preprint arXiv:0807, 2008, 29 pages.
Lee, et al., "On the Utility of Graphics cards to perform massively parallel simulation of advanced Monte Carlo methods", J. of Computer Graph Stat, Dec. 1, 2010, 27 pages.

"Simulation of dependent random variables using copulas", The MathWorks, <http://www.mathworks.com/products/demos/statistics/copulademo.html>, 13 pages, Unknown date, Unknown author.
"Distributions, Simulation, and Excel Functions", <http://www.sba.oakland.edu/faculty/isken/hcm540/Session03_DMUncertainty/DistributionsSimulationExcelFunctions.pdf>, 4 pages, Jun. 11, 2013, unknown author.
Wikipedia, "Monte Carlo Method", <http://en.wikipedia.org/wiki/Monte_Carlo_method>, 10 pages, date unknown, author unknown.
"Data Analysis & Simulation", MathWave Technologies, <http://mathwave.com/blog/category/distributions/>, Dec. 2, 2013, 6 pages.
Man, Nguyen, V.M., "Mathematical Modeling and Simulation", Sep. 6, 2010, 70 pages (pp. 1-35).
Man, Nguyen, V.M., "Mathematical Modeling and Simulation", Sep. 6, 2010, 70 pages (pp. 36-70).
"Simulation Tutorial—Models", 2014 Frontline Systems, Inc., <http://www.solver.com/simulation-models>, 2 pages, (Author unknown).
"The mathematics of safe machine intelligence", Machine Intelligence Research Institute, <http://intelligence.org/research/?gclid=CMGIkJGzpb4CFUuXOgodKj4ABw>, 4 pages, (unknown date, unknown author).
Reber et al., "Statistics Applets", <http://www.bbn-school.org/us/math/ap_stats/applets/applets.html>, May 2000, 4 pages.
Ing et al., "Mathematical and Computational Modeling and Simulation", < http://www.informatik.uni-hamburg.de/TIS/downloads/Vorlesung_CMS_2005_3.pdf>, 2005, 285 pages (pp. 1-45).
Ing et al., "Mathematical and Computational Modeling and Simulation", < http://www.informatik.uni-hamburg.de/TIS/downloads/Vorlesung_CMS_2005_3.pdf>, 2005, 285 pages (pages 46-86 ).
Ing et al., "Mathematical and Computational Modeling and Simulation", < http://www.informatik.uni-hamburg.de/TIS/downloads/Vorlesung_CMS_2005_3.pdf>, 2005, 285 pages (pp. 87-135).
Ing et al., "Mathematical and Computational Modeling and Simulation", < http://www.informatik.uni-hamburg.de/TIS/downloads/Vorlesung_CMS_2005_3.pdf>, 2005, 285 pages (pp. 136-192).
Ing et al., "Mathematical and Computational Modeling and Simulation", < http://www.informatik.uni-hamburg.de/TIS/downloads/Vorlesung_CMS_2005_3.pdf>, 2005, 285 pages (pp. 193-240).
Ing et al., "Mathematical and Computational Modeling and Simulation", < http://www.informatik.uni-hamburg.de/TIS/downloads/Vorlesung_CMS_2005_3.pdf>, 2005, 285 pages (pp. 241-285).
Office Action received for U.S. Appl. No. 14/210,361, dated Feb. 7, 2017, 40 pages.
Lopes et al., "Particle Filters and Bayesian Inference in Financial Econometrics", J. of Forecasting, Jul. 30, 2010, 42 pages.
Office Action received for U.S. Appl. No. 14/210,361, dated Oct. 20, 2017, 9 pages.

* cited by examiner

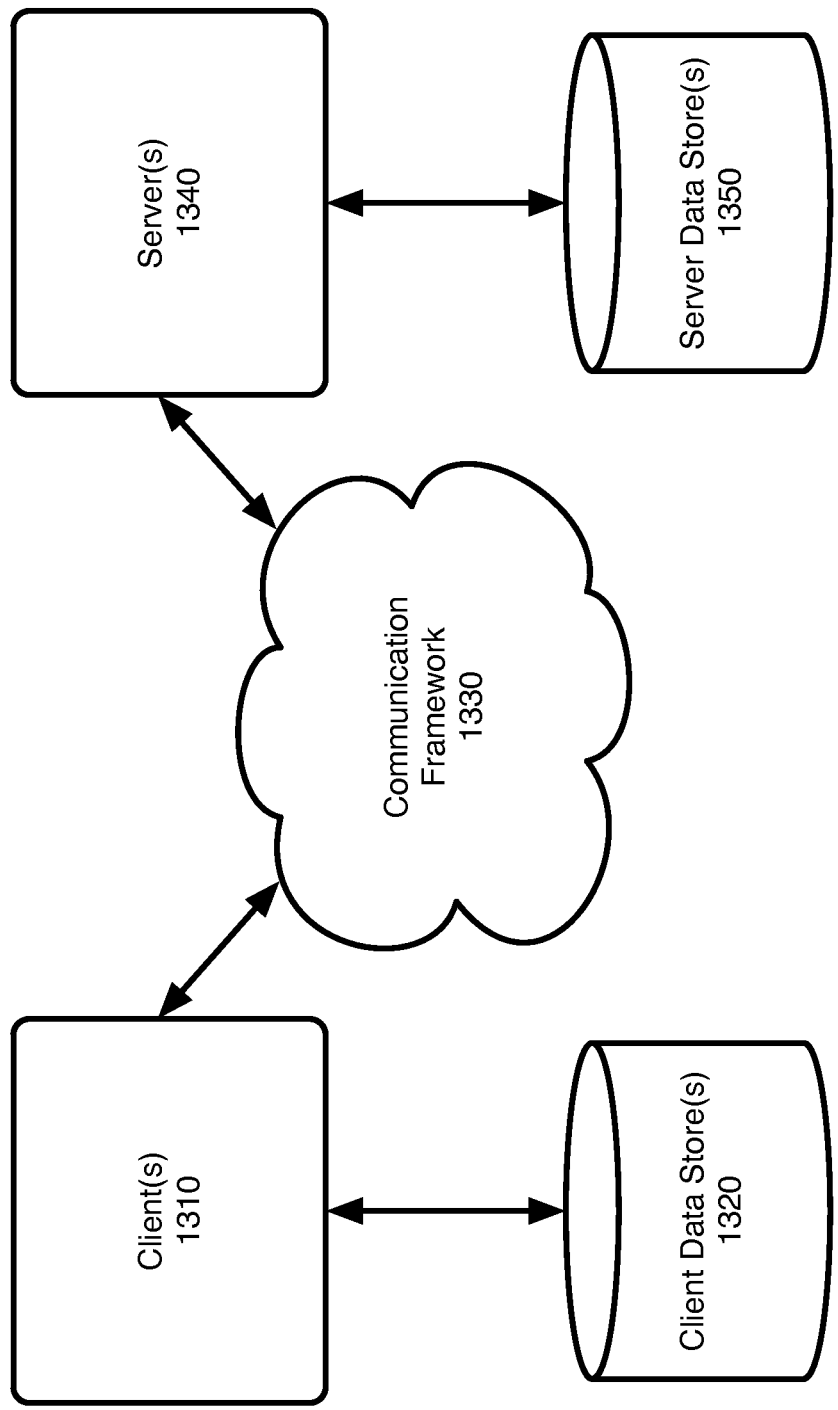

TECHNIQUES FOR AUTOMATED BAYESIAN POSTERIOR SAMPLING USING MARKOV CHAIN MONTE CARLO AND RELATED SCHEMES

RELATED APPLICATION

This application claims the benefit of priority under 35 U.S.C. § 119(e) to U.S. Provisional Application No. 61/779,136, filed Mar. 13, 2013, which is hereby incorporated by reference in its entirety and this application claims the benefit of priority under 35 U.S.C. § 119(e) to U.S. Provisional Application No. 61/779,184, filed Mar. 13, 2013, which is hereby incorporated by reference in its entirety.

This instant application is related to commonly owned U.S. patent application filed today, titled "TECHNIQUES FOR AUTOMATED BAYESIAN POSTERIOR SAMPLING USING MARKOV CHAIN MONTE CARLO AND RELATED SCHEME" as Ser. No. 14/210,301, which is incorporated by reference in its entirety and related to commonly owned U.S. patent application filed today, titled "TECHNIQUES FOR PRODUCING STATISTICALLY CORRECT AND EFFICIENT COMBINATIONS OF MULTIPLE SIMULATED POSTERIOR SAMPLES" as Ser. No. 14/210,361, which is incorporated by reference in its entirety.

BACKGROUND

The importance of Bayesian analysis has grown over the years due to development of Markov Chain Monte Carlo (MCMC) simulation methods, as well as the availability of affordable computing power. Bayesian analysis tends to be focused on the analysis of the so-called "posterior distribution," and the MCMC simulation methods are able to produce approximate samples from this distribution. MCMC simulation methods may approximate a posterior distribution by generating approximate samples. The approximation may improve if the number of generated samples is large.

SUMMARY

The following presents a simplified summary in order to provide a basic understanding of some novel embodiments described herein. This summary is not an extensive overview, and it is not intended to identify critical elements or to delineate the scope thereof. Its sole purpose is to present some concepts in a simplified form as a prelude to the more detailed description that is presented later.

Various embodiments are generally directed to techniques for automating the diagnostic testing, monitoring, and tuning of Bayesian sampling. Techniques described herein may provide for automated generation of one or more input parameters for Bayesian sampling. The one or more parameters might include burn-in values, a number of tuning samples, and a number of posterior samples, for example. Further, techniques may include one or more phases to test for stationarity and accuracy of samples of a posterior distribution.

Techniques for automated Bayesian posterior sampling using Markov Chain Monte Carlo and related schemes are described. In an embodiment, one or more values in a stationarity phase for a system configured for Bayesian sampling may be initialized. Sampling may be performed in the stationarity phase based upon the one or more values to generate a plurality of samples. The plurality of samples may be evaluated based upon one or more stationarity criteria. The stationarity phase may be exited when the plurality of samples meets the one or more stationarity criteria. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 13 illustrates an example of a communications architecture.

DETAILED DESCRIPTION

Figure 1:
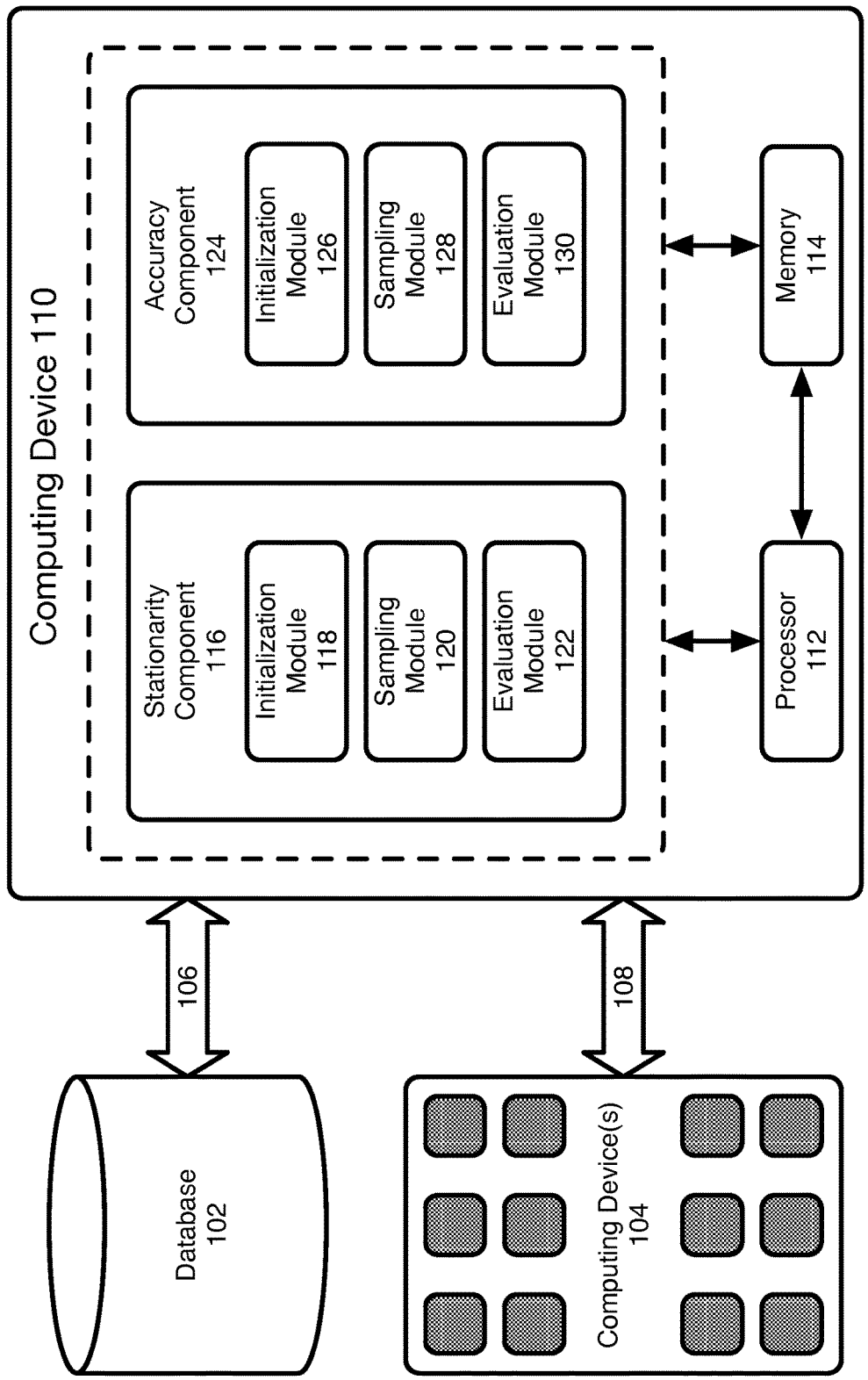
FIG. 1 illustrates an example of a system.

Various embodiments are generally directed to techniques for automating the diagnostic testing, monitoring, and tuning of statistical sampling. In particular, techniques described herein may provide for automated generation and modification of one or more input parameters for Bayesian sampling. In addition, embodiments described herein may be used for any method statistical techniques. The one or more parameters might include a burn-in value (NBI), which may represent the number of samples that must be discarded before being able to sample from a posterior distribution. Parameters might also include a number of tuning samples (NTU), which are samples that are generated during a tuning phase. Further, parameters might include a number of posterior samples (NMC), which might be the number of samples after the burn-in that may be used to approximate the posterior distribution.

Further, techniques described herein may include one or more phases to test for stationarity and accuracy of samples of a posterior distribution. During each phase, various tests may be used to evaluate stationarity and accuracy during Bayesian sampling. Based upon the results of one or more tests, modifications may be automatically made to one or more of the input parameters until stationary and accuracy criteria are satisfied. By way of example and not limitation, the one or more tests may include the Geweke test, Heidelberger-Welch test, the Raftery-Lewis test, and an effective sample size test.

The Geweke test may be used to check stationarity by comparing local means. The Heidelberger-Welch test may be used to determine covariance stationarity and to indicate a proxy of a burn-in. The Heidelberger-Welch half test may be used to check if the mean is accurate. The Raftery-Lewis test may be used to determine whether a given percentile is evaluated accurately, to indirectly provide an estimate of the number of samples needed to accurately estimate the percentile, and to indicate a proxy of a burn-in. An effective sample size test may be used to determine a number of samples needed for sufficient accuracy. Of course, it can be appreciated by one in of skill in the art that the tests above may be used in various combinations with the embodiments described herein. Further, other tests known to those in the art for determination of stationarity, accuracy, or burn-in may be used.

The automated techniques described herein may reduce the need for experienced testers to view various plots, tests, and statistics, evaluate the results, and make a determination as to whether various options need to be manually adjusted by them and re-tested. The automated techniques described herein may also help inexperienced users who do not have advanced knowledge of the Bayesian field, or who may not have a good feel of some subjective aspects for various Bayesian-related implementations or procedures.

Based upon the results of one or more stationary and accuracy tests, various embodiments may be configured to perform automated adjustments for the one or more parameters described herein. In this manner, non-expert users may be able to employ Bayesian statistical model and prediction tools. Further, embodiments described herein may enable the automated employment of various Bayesian-related implementations or procedures for business and industrial applications with a wide assortment of applications without, or with reduced, need for human intervention or monitoring.

In some embodiments, the utilization of parallel computing may shorten the time required to generate an approximating sample of a posterior distribution, in particular, an approximate sample of a large size. Embodiments described herein may run multiple MCMC algorithms in parallel chains and, by combining the parallel chains, an approximate sample of a posterior distribution may be obtained, which may improve with the number of chains run. The corresponding degree of approximation may be determined, not only by the number of samples within each chain, but also by the number of chains that can be run in parallel.

With general reference to notations and nomenclature used herein, the detailed descriptions that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to these communications as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an example of a system designed to implement various techniques for producing stationary and accurate combinations of posterior samples from MCMC and related Bayesian sampling schemes. The system 100 may be implemented as part of a computing system or communications system, examples of which are described in more detail herein with reference to FIGS. 10-13. Although the system 100 as shown in FIG. 1 has a limited number of elements in a certain topology, it may be appreciated that the system 100 may include more or less elements in alternate topologies as desired for a given implementation.

In the illustrated embodiment shown in FIG. 1, the system 100 comprises multiple components, including database 102, computing devices 104, and computing device 110. Database 102 may be included within a server device or other computing device, or distributed among a plurality of computing devices, as described below. Computing devices 104 and computing device 110 may each be implemented as any electronic device having computing and/or communications capabilities. Examples of database 102, computing devices 104, and computing device 110 may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a mainframe computer, a supercomputer, a network appliance, a web appliance, multiprocessor systems, processor-based systems, or any combination thereof. The embodiments are not limited in this context.

In various embodiments, database 102, computing devices 104, and computing device 110 may comprise or implement multiple components or modules. As used herein the terms "component" and "module" are intended to refer to computer-related entities, comprising either hardware, a combination of hardware and software, software, or software in execution. For example, a component and/or module can be implemented as a process running on a processor (such as processor 112), a hard disk drive, multiple storage drives (of optical and/or magnetic storage medium), an object, an executable, a thread of execution, a program, and/or a computer. By way of illustration, both an application running on a server and the server can be a component and/or module. One or more components and/or modules can reside within a process and/or thread of execution, and a component and/or module can be localized on one computer and/or distributed between two or more computers as desired for a given implementation. The embodiments are not limited in this context.

The various devices of system 100, and components and/or modules within a device of system 100, may be communicatively coupled via various types of communications media as indicated by various lines or arrows, such as connections 106 and 108. The devices, components and/or modules may coordinate operations between each other. The coordination may involve the uni-directional or bi-directional exchange of information. For instance, the devices, components and/or modules may communicate information in the form of transmissions communicated over the communications media. The information can be implemented as transmissions allocated to various communication lines. In such allocations, each message is a transmission. Further embodiments, however, may alternatively employ data messages. Such data messages may be sent across various connections. Exemplary connections within a device include parallel interfaces, serial interfaces, and bus interfaces. Exemplary connections between devices may comprise network connections over a wired or wireless communications network.

In various embodiments, database 102, computing devices 104, and computing device 110 of the system 100 may be organized as a distributed system. A distributed system typically comprises multiple autonomous computers that communicate through a computer network. The computers interact with each other in order to achieve a common goal, such as solving computational problems. For example, a computational problem may be divided into many tasks, each of which is solved by one computer. A computer program that runs in a distributed system is called a distributed program, and distributed programming is the process of writing such programs. Examples of a distributed system may include, without limitation, a client-server architecture, a 3-tier architecture, an N-tier architecture, a tightly-coupled or clustered architecture, a peer-to-peer architecture, a master-slave architecture, a shared database architecture, and other types of distributed systems. It is worthy to note that although some embodiments may utilize a distributed system when describing various enhanced techniques for data retrieval, it may be appreciated that the enhanced techniques for data retrieval may be implemented by a single computing device as well. The embodiments are not limited in this context.

In various embodiments, computing device 110 may operate as a central processing node or coordinating device to coordinate distributed processing operations implemented by computing devices 104. Computing devices 104 and computing device 110 may include one or more processors and one or more data subsets communicatively coupled to the processors. Data subsets, which may be stored within database 102, memory of computing devices 104, and/or memory 114, may include memory units, which may store various data blocks for retrieval by components or modules, such as stationarity component 116, initialization module 118, sampling module 120, evaluation module 122, accuracy component 124, initialization module 126, sampling module 128, and evaluation module 130, for example. In one embodiment, each of these components and/or modules may be software elements that, when executed by processors of computing devices 104 and/or computing device 110, perform a discrete set of operations.

Some functional aspects of the stationarity component 116 are described with respect to flow charts representing a stationarity phase 200, 300, 400, and 500, as illustrated in FIGS. 2-5. Some functional aspects of the accuracy component 124 are described with respect to flow charts representing an accuracy phase 600, 700, 800, and 900, as illustrated in FIGS. 6-9.

In some embodiments, some of the functions associated with the stationarity component 116 may be processed before the functions associated with the accuracy component 124 are processed. In other embodiments, all of the functions associated with the stationarity component 116 may be processed before the functions associated with the accuracy component 124 are processed. In these embodiments, the stationarity phase is performed before the accuracy phase.

Components of computing device 110 may be generally arranged to manage operations performed on one or more datasets of database 102 utilizing one or more of computing devices 104. In an embodiment, database 102 may include data representing a posterior distribution, in which one or more samples may be taken. Of course database 102 may include additional data, include one or more additional posterior samples, for example. A posterior distribution may include a distribution of multiple data items, data elements or samples within a given population (collectively referred to herein as "data items"). In one embodiment, the data items may each comprise an alphanumeric value. By way of example, a posterior distribution may be used to generate a series of approximate samples generated by the components and modules of computing device 110 or similar modules of computing devices 104 (not shown). For example, computing device 110 and/or each of computing devices 104 may perform one or more MCMC algorithms that may be configured to generate an approximate sample of a posterior distribution. In an embodiment, stationarity component 116 and accuracy component 124 may be configured to automatically generate stationary and accurate approximate samples according to the techniques discussed herein.

In some embodiments, operations may be allocated among multiple computing, or processing, nodes of system 100, such as computing devices 104, each including one or more processing nodes, components, and modules. In an embodiment, each of computing devices 104 may include the components and modules illustrated and described with respect to computing device 110. Each processing node may be assigned one or more samples to process according to stationarity tests, accuracy test, and MCMC simulation methods. A processing node may represent some discrete measure of computational resources. Examples of a processing node may include without limitation a processing thread, multiple processing threads, a processor, multiple processors, and so forth. One or more processing nodes may be implemented on a single device or multiple devices. For instance, when implemented by a single device such as computing device 110, a processing node may comprise a processing thread implemented on a single processor. In this case multiple processing nodes may be implemented as multiple processing threads on single processors, a single processing thread on each of multiple processors, multiple processing threads on multiple processors, or some combination thereof. In another example, when implemented by multiple devices such as computing devices 104, a processing node may comprise an entire computing device having one or more processors. In this case, multiple processing nodes may be implemented as two or more computing devices, such as computing devices 104. It may be appreciated that multiple processing nodes may be implemented in any combination of single computing devices and multiple computing devices, each having one or more processors capable of executing one or more processing threads, as desired for a given implementation. The embodiments are not limited in this context.

In various embodiments, multiple processing nodes as implemented by computing devices 104 may be arranged to process multiple data samples of a posterior distribution in a parallel or sequential manner. For example, computing devices 104 may each perform a discrete set of operations for respective data samples. In an embodiment, computing device may include stationarity component 116, which may be configured to perform a stationarity phase that may initialize one or more input parameters and test for stationarity of samples from a posterior distribution, which may be stored on memory 114 or accessed from database 102. Stationarity component 116 may include one or more modules, such as initialization module 118, sampling module 120, and evaluation module 122, for example. After one or more stationary criteria have been met, as discussed below, the accuracy component 124 may be used to test for accuracy of samples from a posterior distribution.

During an initialization procedure, initialization module 118 may initialize one or more input parameters, such as NTU, NMC, and NBI. In an exemplary embodiment, NTU and NBI may be initialized based upon one or more proxies and, in some cases, may be initialized to zero. NMC may be initialized to a value based upon a variety of factors, such as desired time, available processing power, and size of a posterior distribution, for example. In one such example, NMC might be initialized to an initial value. A processing unit, such as processor 112 or computing devices 104, may dynamically generate initial values. Further, in some embodiments, initial values may be input by a user using one or more input techniques, such as those described below with respect to FIG. 12. In some embodiments, NTU may be iteratively adjusted to identify an optimal proposal distribution based upon a percentage of successful stationary tests.

Initialization module 118 may be configured to test the acceptance ratio of a Markov Chain Monte Carlo (MCMC) method for obtaining a sequence of random samples from a probability distribution and to approximate the distribution. One example of a MCMC method is the Metropolis-Hastings algorithm, which may be used to generate a sequence of sample values in such a way that, as more and more sample values are produced, the distribution of values more closely approximates a desired distribution, P(x). These sample values may be produced iteratively, with the distribution of the next sample being dependent only on the current sample value (thus making the sequence of samples into a Markov chain). Specifically, the algorithm may iteratively pick a candidate for the next sample value based on the current sample value. Then, with some probability, the candidate may either be accepted (in which case the candidate value may be used in the next iteration) or rejected (in which case the candidate value may be discarded, and current value may be reused in the next iteration). The probability of acceptance may be determined by comparing the likelihoods of the current and candidate sample values with respect to the desired distribution P(x). While the Metropolis-Hastings algorithm has been described for purposes of illustration, it can be appreciated that any MCMC algorithm may be used.

As described above, an acceptance ratio may be calculated based upon the results of an MCMC algorithm, which may determine a ratio of acceptable stationary samples, NTU. In some embodiments, values for NTU, NMC, and NBI may be iteratively tuned based upon the results of one or more tests. The initialization phase may be repeated until the acceptance ratio of the MCMC algorithm becomes optimal according to some criteria or when some number of maximum number of initialization phases is reached. For example, it may be determined that a sample size has grown too large during initialization, while still not generating a proper acceptance ratio. In this case, the initialization may be terminated.

Sampling module 120 may accept an initialized set of parameters from initialization module 118 and identify an optimal proposal distribution for an MCMC algorithm. Further, sampling module 120 may obtain samples from a posterior distribution using an MCMC algorithm, similar to the MCMC method described above. Once posterior samples are obtained, sampling module 120 may pass, or otherwise make available, generated samples from the posterior distribution to evaluation module 122, which may be used to test the samples for stationarity according to one or more stationarity tests. In an example, samples may be stored in memory 114 or database 102 and the locations, or references, may be passed to evaluation module 122.

Evaluation module 122 may be configured to perform one or more stationarity tests on posterior samples, NMC, generated by sampling module 120. For example, as described above, the Geweke test may be used to check stationarity by comparing local means. The Heidelberger-Welch test may be used to determine covariance stationarity and to indicate a proxy of a burn-in. These tests, or other tests, may be used to search for a stationary sample from the posterior distribution. In addition, evaluation module 122 may evaluate a proxy for NMC and evaluate a NBI proxy and determine a burn-in value.

In an embodiment, evaluation module 122 may use the Raftery-Lewis test to provide a proxy of the sample size needed to obtain an accurate analysis of a given percentile. For example, if the predicted number of samples, RL(NMC), is larger than the actual number of samples, NMC>RL(NMC), then the actual number of samples may be augmented by the Raftery-Lewis proxy, NMC=RL(NMC), until a desirable result is obtained.

As described above, the burn-in (NBI) may be evaluated by evaluation module 122. The Heidelberger-Welch test may provide a proxy for the size of the burn-in. When the predicted burn-in is not zero, NBI(HW)>0, the actual burn-in (NBI) may be increased by the corresponding amount: NBI=NBI+NBI(HW). Thus, a possible criteria for exited the stationarity phase may be that the NBI predicted by Heidelberger-Welch is zero, or some other desirable value.

Based upon one or more criteria, evaluation module 122 may determine whether to confirm stationarity and exit stationarity phase, or whether to re-initialize using initialization module 118. In an embodiment, if all parameters are determined to be stationary according to one or more tests, the stationarity phase may end. If all parameters are not determined to be stationary, the process may be repeated with a different sample size. Thus, depending on the outcome of the stationary tests, the process may be repeated with a larger sample (NTU) until the requirements for exiting the stationarity phase are met or the maximum number of loops is exceeded. For example, it may be determined that a sample size has grown too large, while still not passing the stationarity tests. In this case, the stationarity phase may be terminated.

In some embodiments, if the stationarity process needs to be repeated, the size of NTU may be automatically modified based upon the results of previous stationarity tests. For example, if the chains of very few parameters seem to be characterized by stationarity, then the stationarity phase may be repeated with a significantly larger number of samples (NTU). However, if most of the parameters are stationary and few need further tuning, the stationarity phase may be repeated with a relatively small increase of the tuning samples (NTU). In this manner, a minimal number of samples may be generated, while maintaining a satisfactory representation of a posterior distribution.

In various embodiments, accuracy component 124 may include evaluation module 130, which may perform one or more accuracy tests on a posterior distribution after a stationarity phase has ended. For example, once a stationarity phase has ended, and the posterior distribution has been determined to be stationary, evaluation module 130 may receive initial stationary samples and may determine whether the mean and some given percentiles of the posterior distribution are evaluated accurately. When accuracy is determined to be below a threshold amount (for example, when the Raftery-Lewis test indicates that more NMC are required, RL(NMC>0), accuracy component 124 may draw additional samples (NMC) from the posterior distribution using initialization module 126 and sampling module 128. The amount of additional samples may be determined by the degree of accuracy of mean and percentiles, which may be determined using the Raftery-Lewis and/or Heidelberger-Welch tests.

Accuracy component may include initialization module 126. When evaluation module 130 has determined that the posterior distribution is not accurate based upon one or more criteria, parameters may be reinitialized by initialization module 126. For example, initialization module 126 may initialize NBI and NMC values. These values may be manually input by a user, may include default values, or may be initialized based upon one or more previous tests. For example, NMC may be initialized based upon a percentage of successful accuracy tests, with more samples being drawn when less accuracy is determined. Once NMC and NBI have been initialized, or re-initialized, sampling module 128 may draw additional samples using an MCMC algorithm, as described above. Evaluation module 130 may reevaluate the newly drawn samples, as described above, and may either confirm the accuracy of the samples, determine that re-initialization is needed, or in some embodiments, determine that the sample is bad and terminate the accuracy phase.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer). For example, a logic flow may be implemented by a processor component executing instructions stored on an article of manufacture, such as a storage medium or a computer-program product. A storage medium may comprise any non-transitory computer-readable medium or machine-readable medium, such as an optical, magnetic or semiconductor storage. The storage medium may store various types of computer executable instructions, such as instructions to implement one or more disclosed logic flows. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 2:
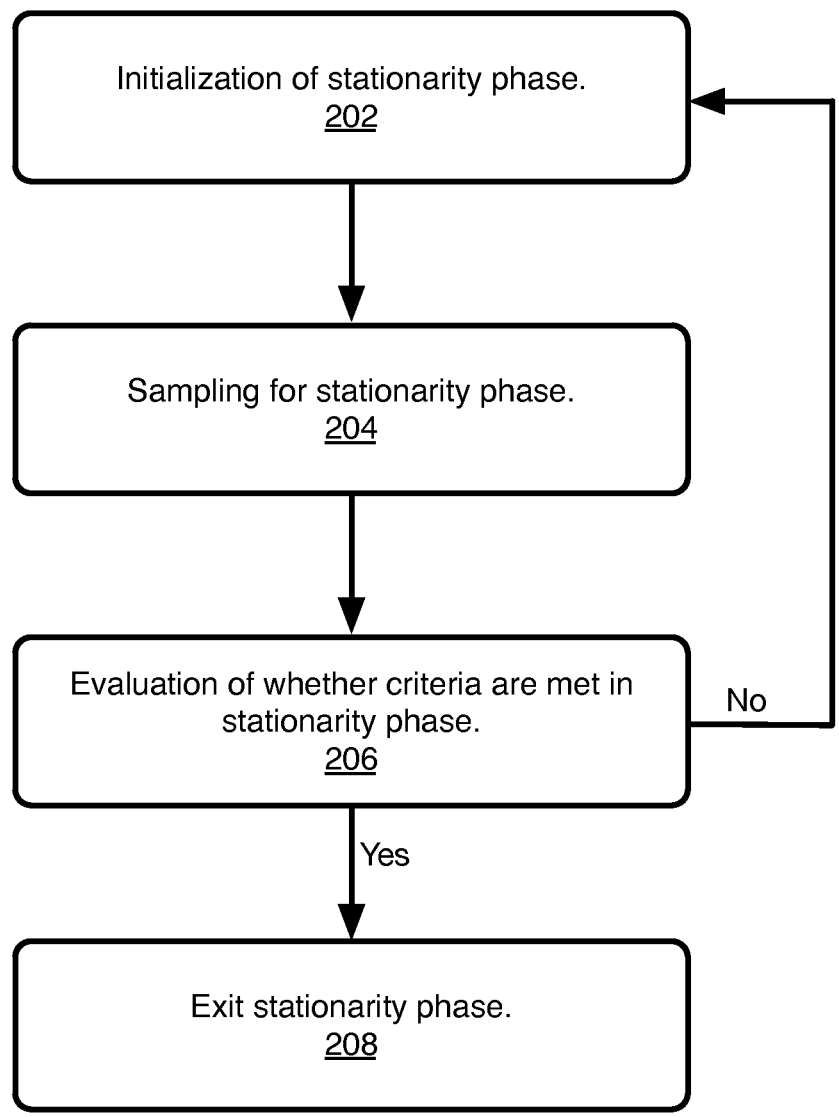
FIG. 2 illustrates an example of a logic flow representing a stationarity phase.

FIG. 2 illustrates an example of a logic flow, which provides an example of a stationarity phase 200 according to an embodiment. At 202, a stationarity phase may be initialized, in which values for NTU, NMC, and NBI may be set, as described herein.

At 204, sampling may be performed for the stationarity phase. Samples may be obtained from a posterior distribution using an MCMC algorithm, similar to the MCMC method described above. Once posterior samples are obtained, at 206, one or more samples may be evaluated based upon one or more stationarity criteria and a determination may be made regarding whether the samples have reached stationarity, and the stationarity phase 200 may be exited at 208. If the one or more criteria are not met, the stationarity phase may be restarted by re-initializing the stationarity phase at 202.

Figure 3:
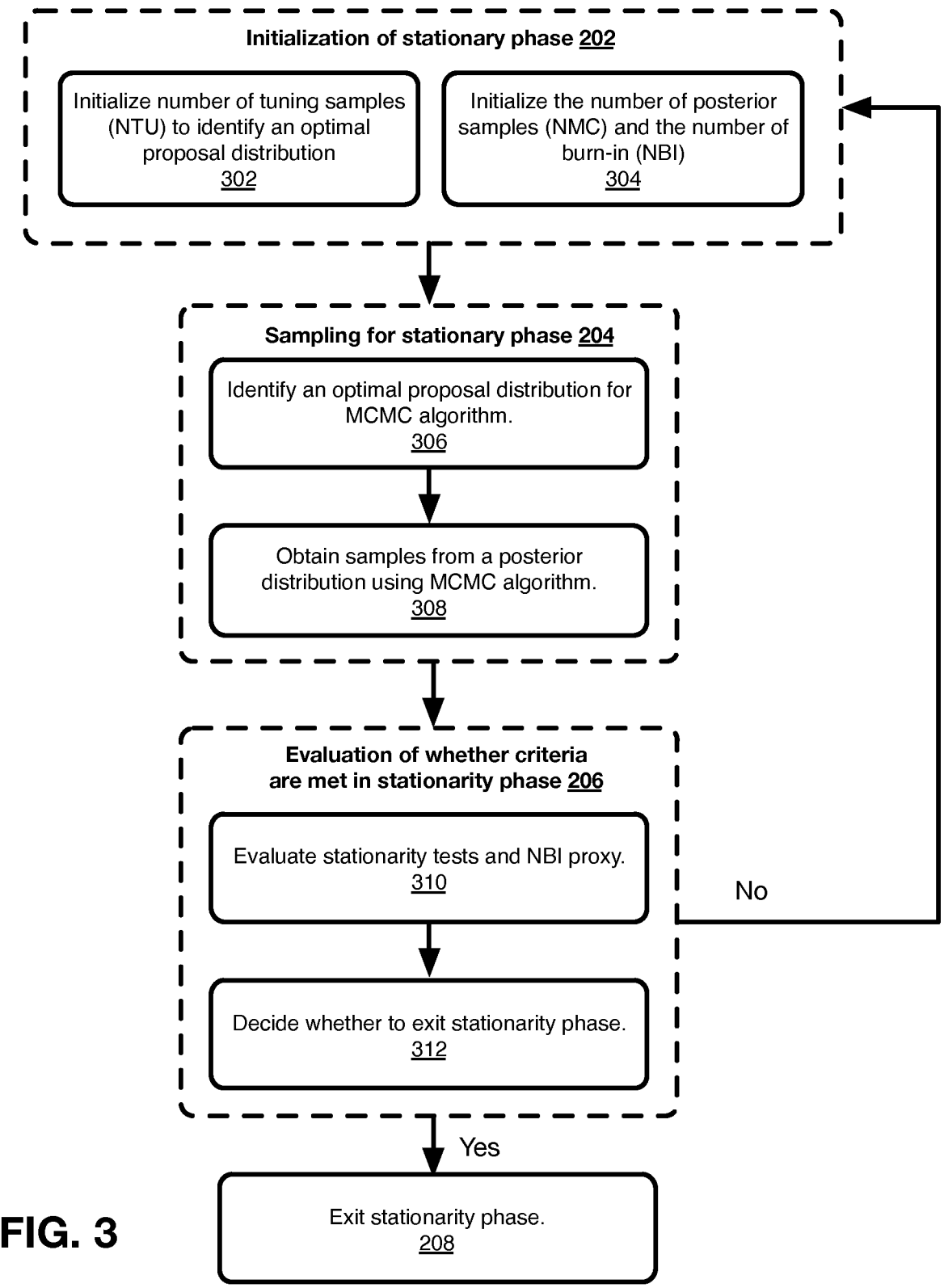
FIG. 3 illustrates an example of a logic flow representing a stationarity phase.

FIG. 3 illustrates an example of a logic flow, which provides an example of a stationarity phase 300 according to an embodiment. Stationarity phase 300 may provide further detail to stationarity phase 200, described above. For example, at 202, blocks 302 and 304 may be performed. At 302, a number of tuning samples (NTU) may be initialized to identify an optimal proposal distribution for the MCMC algorithm. Specifically, at 306, a sampling module may generate several preliminary sets of samples of length NTU. Each preliminary set may be obtained with a different proposal distribution. The proposal distribution that provides the best preliminary samples may be used by the sampling module at 308. At 304, the number of posterior samples (NMC) and the number of burn-in (NBI) may be adjusted In particular, at each iteration of the stationary phase, the proxies for NBI may indicate that some additional NBI is needed. When the predicted burn-in is not zero, PROXY(NBI)>0, the actual burn-in (NBI) may be increased by the corresponding amount: NBI=NBI+PROXY(NBI). In a similar way, an adjustment of the NMC based on the analysis of NMC proxies may or may not be required. When the predicted NMC, PROXY(NMC)>NMC, the actual NMC may be increased to: NMC=PROXY(NMC).

At 204, stationarity phase sampling may be performed, as described above with respect to FIG. 2. Sampling may include blocks 306 and 308, for example. At block 306, an optimal proposal distribution for an MCMC algorithm may be identified, as described above. At block 308, samples may be obtained from a posterior distribution using an MCMC algorithm, which may obtain a sequence of random samples from a probability distribution and approximate the distribution. One example of a MCMC algorithm is the Metropolis-Hastings algorithm, which may be used to generate a sequence of sample values in such a way that, as more and more sample values are produced, the distribution of values more closely approximates a desired distribution, P(x). These sample values may be produced iteratively, with the distribution of the next sample being dependent only on the current sample value (thus making the sequence of samples into a Markov chain). Specifically, at each iteration, the algorithm may pick a candidate for the next sample value based on the current sample value. Then, with some probability, the candidate may either be accepted (in which case the candidate value may be used in the next iteration) or rejected (in which case the candidate value may be discarded, and current value may be reused in the next iteration). Of course, other MCMC algorithms may be used in alternative embodiments.

At 206, an evaluation of stationary criteria may be performed, as described above with respect to FIG. 2. The evaluation phase may include blocks 310 and 312, for example. At 310, stationarity and burn-in may be evaluated, as described in more detail below. When one or more stationarity criteria have been met, the stationarity phase may be exited at 208. However, when one or more stationarity criteria have not been met, re-initialization may be performed at 202.

Figure 4:
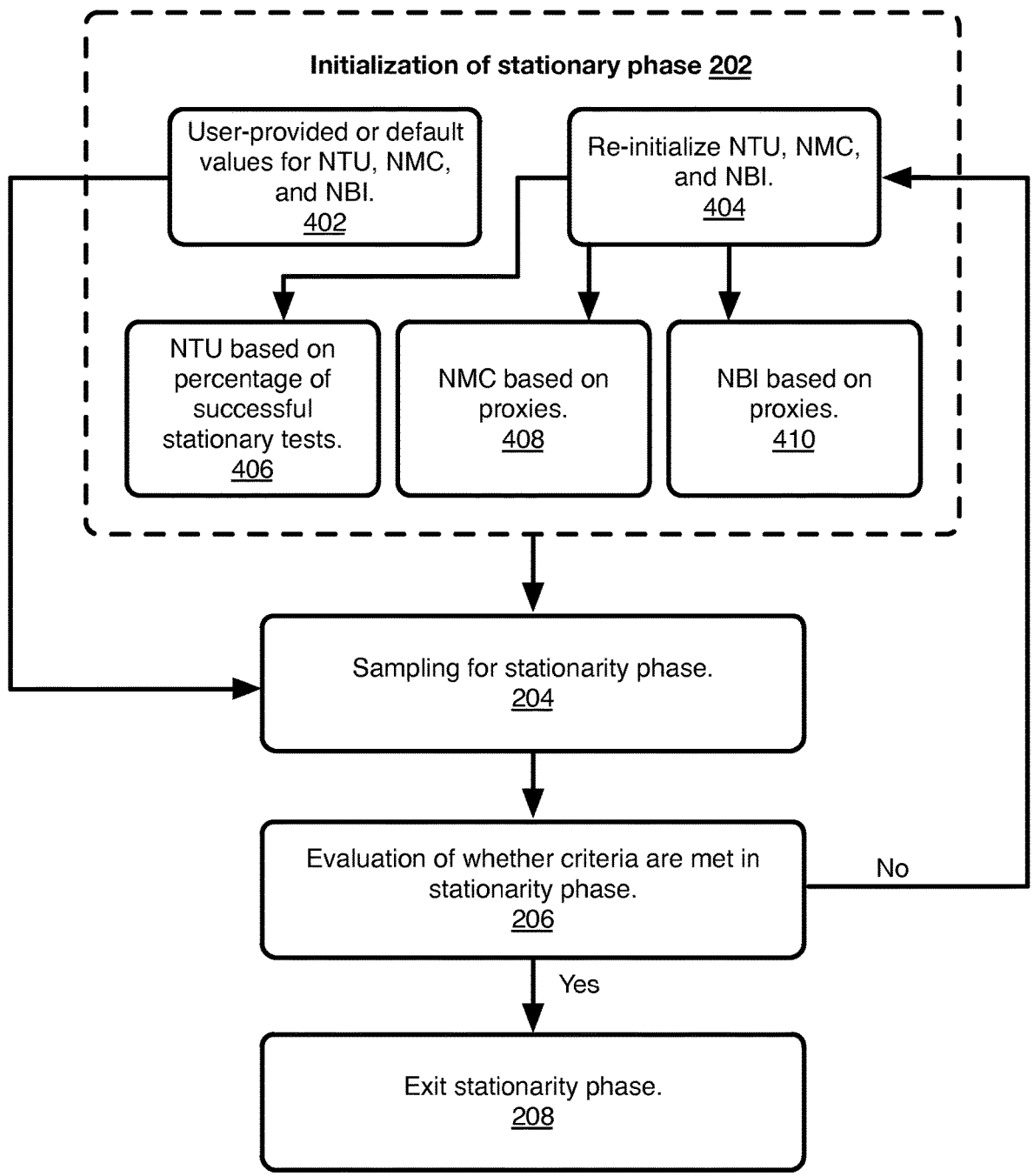
FIG. 4 illustrates an example of a logic flow representing additional details of an initialization phase of a stationarity phase.

FIG. 4 illustrates an example of a logic flow, which provides an example of a stationarity phase 400 according to an embodiment. Stationarity phase 400 may provide further detail to stationarity phase 200 and stationarity phase 300, described above. In particular, stationary phase 400 may provide further detail to the initialization of a stationary phase 202.

At 202, blocks 402, 404, 406, 408, and 410 may be performed during an initialization phase. At 402, a user may provide one or more values for NTU, NMC, or NBI. Further, a system may access one or more default values for NTU, NMC, or NBI. In either case, when values for NTU, NMC, and NBI have been entered by a user or set by default, the initialization phase may end and block 204 may be performed.

At 404, re-initializing NTU, NMC, and NBI may be automatically performed using the procedures of blocks 406, 408, and 410. At 406, NTU may be initialized based upon a percentage of successful stationary tests, for example. At 408, NMC may be initialized based upon proxies, as described above. At 410, NBI may be initialized based upon proxies, as described above. Once re-initialization has taken place, stationarity phase 400 may continue with phases 204, 206, and 208.

Figure 5:
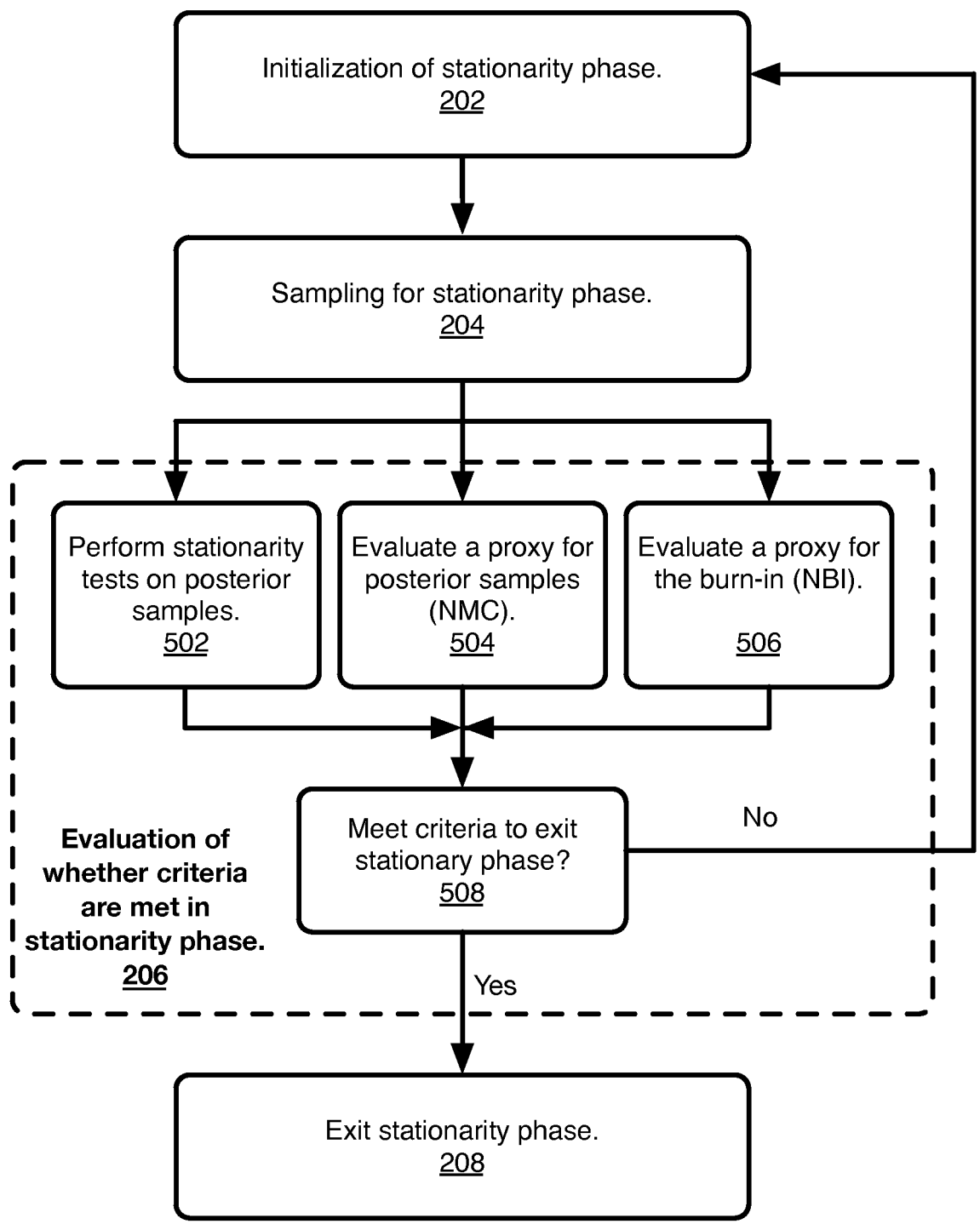
FIG. 5 illustrates an example of a logic flow representing additional details of an evaluation phase of a stationarity phase.

FIG. 5 illustrates an example of a logic flow, which provides an example of a stationarity phase 500 according to an embodiment. Stationarity phase 500 may provide further detail to stationarity phase 200, described above. In particular, stationary phase 500 may provide further detail to the evaluation of a stationary phase 206. Once sampling has completed at 204, an evaluation phase 206 may evaluate one or more criteria for stationarity. For example, at 502, stationarity tests may be performed on posterior samples identified at block 204. For example, as described above, the Geweke test may be used to check stationarity by comparing local means. The Heidelberger-Welch test may be used to determine covariance stationarity and to indicate a proxy of a burn-in. These tests, or other tests, may be used to search for a stationary sample from the posterior distribution. Upon completion of 502, logic flow 500 may proceed to 508, discussed below.

At 504, a proxy for NMC may be evaluated. In an embodiment, the Raftery-Lewis test may provide a proxy of the sample size needed to obtain an accurate analysis of a given percentile. For example, if the predicted number of samples, RL(NMC), is larger than the actual number of samples, NMC>RL(NMC), then the actual number of samples may be augmented by the Raftery-Lewis proxy, NMC=RL(NMC), until a desirable result is obtained. Upon completion of 504, logic flow 500 may proceed to 508, discussed below.

At 506, a NBI proxy may be evaluated and a burn-in value may be determined. As described above, the Heidelberger-Welch test may provide a proxy for the size of the burn-in. When the predicted burn-in is not zero, NBI(HW)>0, the actual burn-in (NBI) may be increased by the corresponding amount: NBI=NBI+NBI(HW). Thus, one of the criteria for exiting the stationarity phase may be that the NBI predicted by Heidelberger-Welch is zero. Upon completion of 506, logic flow 500 may proceed to 508, discussed below.

At 508, based upon the evaluation performed at 502, 504, and 506, a determination may be made as to whether to confirm stationarity and exit stationarity phase at 208, or whether to re-initialize at 202. In an embodiment, if all parameters are determined to be stationary according to one or more tests, the stationarity phase may end. If all parameters are not determined to be stationary, the process may be repeated with a different sample size. Thus, depending on the outcome of the stationary tests, the process may be repeated with a larger sample (NTU) until the requirements for exiting the stationarity phase are met or the maximum number of loops is exceeded. For example, it may be determined that a sample size has grown too large, while still not passing the stationarity tests. In this case, the stationarity phase may be terminated at 208.

Figure 6:
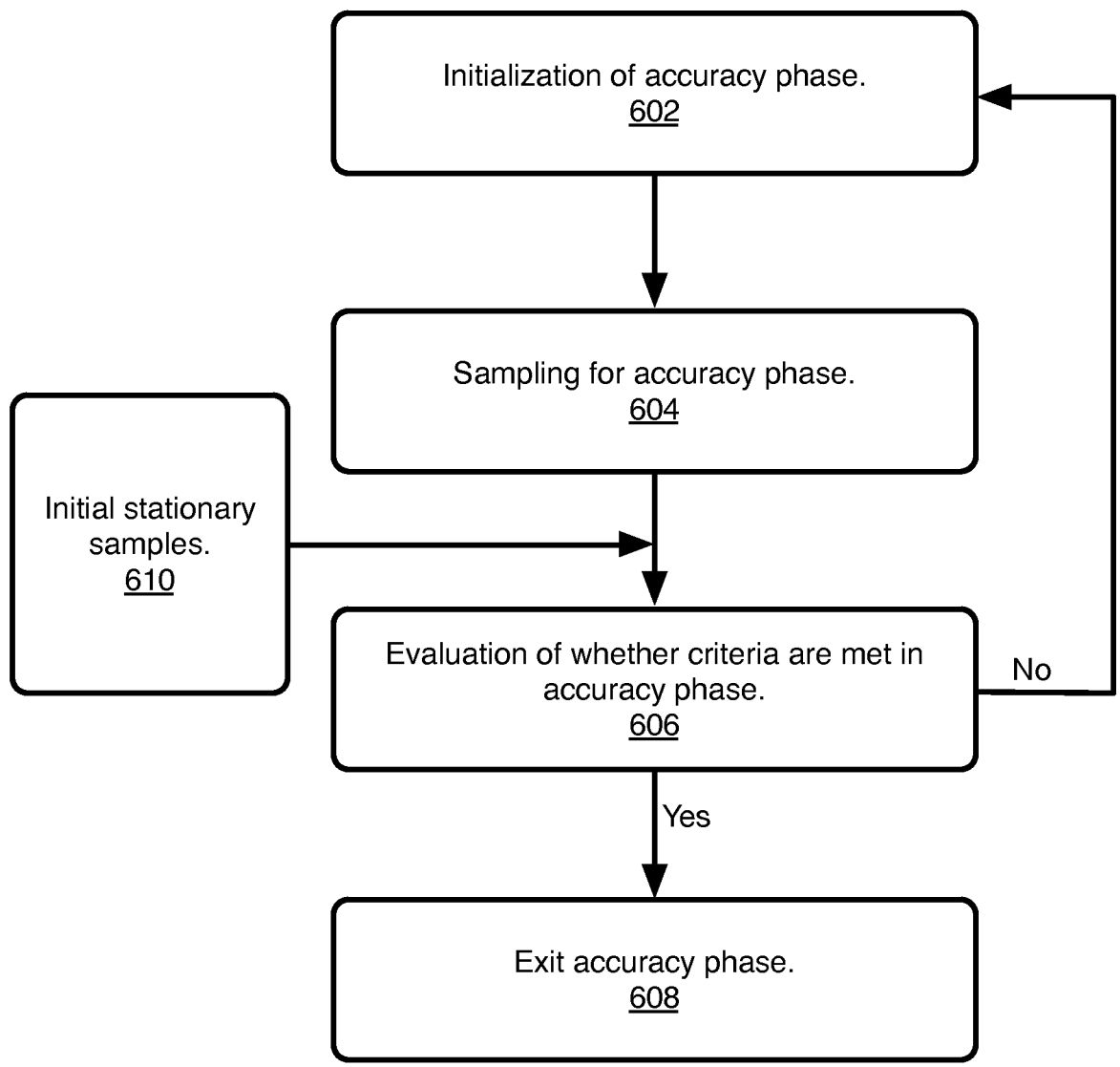
FIG. 6 illustrates an example of a logic flow representing an accuracy phase.

FIG. 6 illustrates an example of a logic flow, which provides an example of an accuracy phase 600 according to an embodiment. In various embodiments, an accuracy phase may perform one or more accuracy tests on a posterior distribution after a stationarity phase has ended. For example, at 606, once a stationarity phase has ended, and the posterior distribution has been determined to be stationary, initial stationary samples 610 may be received and the mean and some given percentiles of the posterior distribution may be evaluated for accuracy. When accuracy is determined to be below a threshold amount (for example, when the Raftery-Lewis test indicates that more NMC are required, RL(NMC)>0), initialization at 602 and sampling at 604 may be performed prior to additional accuracy tests. The amount of additional samples may be determined by the degree of accuracy of mean and percentiles, which may be determined using the Raftery-Lewis and/or Heidelberger-Welch tests.

In an embodiment, at 602, accuracy phase be initialized when an accuracy evaluation at 606 has failed because the posterior distribution is not accurate based upon one or more criteria. Upon initialization, additional sampling may be performed at 604 consistent with the sampling techniques described herein. Once initialization and sampling has taken place, an accuracy evaluation is performed again and, if accuracy is found, the accuracy phase may be exited at 608. If accuracy is not sufficient, the process may repeat until an accurate posterior distribution is found, or a maximum limit of samples has been reached.

Figure 7:
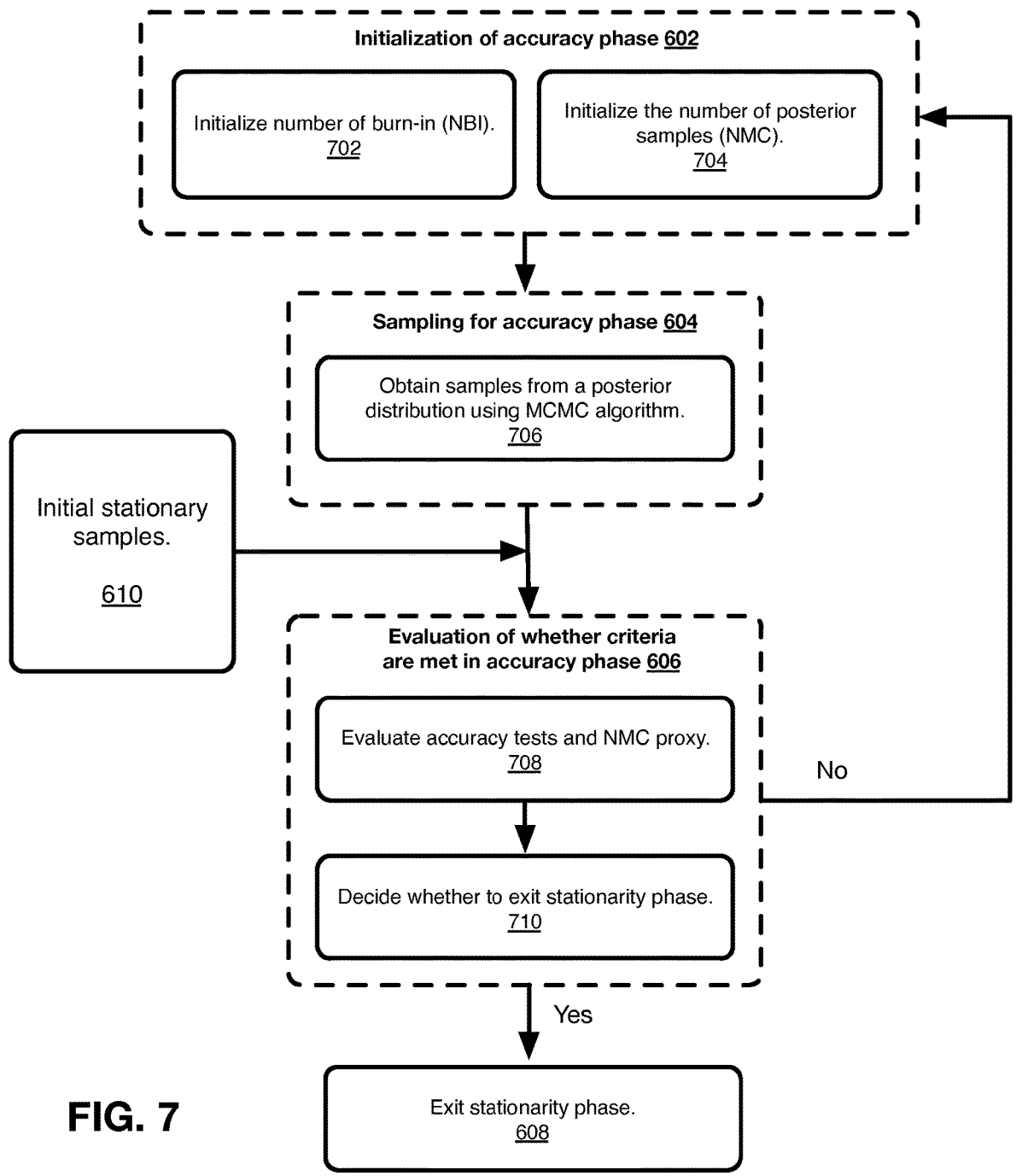
FIG. 7 illustrates an example of a logic flow representing an accuracy phase.

FIG. 7 illustrates an example of a logic flow, which provides an example of an accuracy phase 700 according to an embodiment. Accuracy phase 700 may provide further detail to accuracy phase 600, described above. During an initialization phase, at 702 and 704, for example, NBI and NMC values may be initialized. These values may be manually input by a user, may include default values, or may be initialized based upon one or more previous tests. For example, NMC may be initialized based upon a percentage of successful accuracy tests, with more samples being drawn when less accuracy is determined. Once NMC and NBI have been initialized, or re-initialized, additional samples may be drawn using an MCMC algorithm, at 706. At 708, evaluation module 130 may evaluate initial station samples 610, or reevaluate newly drawn samples, as described above, and may either confirm the accuracy of the samples, determine that re-initialization is needed, or in some embodiments, determine that the sample is bad and terminate the accuracy phase.

At 708, evaluation may be performed using accuracy tests, such as determining whether the mean and some given percentiles of the posterior distribution are evaluated accurately using the Raftery-Lewis and/or Heidelberger-Welch tests. When accuracy is determined to be below a threshold amount (for example, when the Raftery-Lewis test indicates that more NMC are required, RL(NMC>0), the process may repeat and draw additional samples (NMC) from the posterior distribution at 602 and 604. The amount of additional samples may be determined by the degree of accuracy of mean and percentiles, which may be determined using the Raftery-Lewis and/or Heidelberger-Welch tests.

Figure 8:
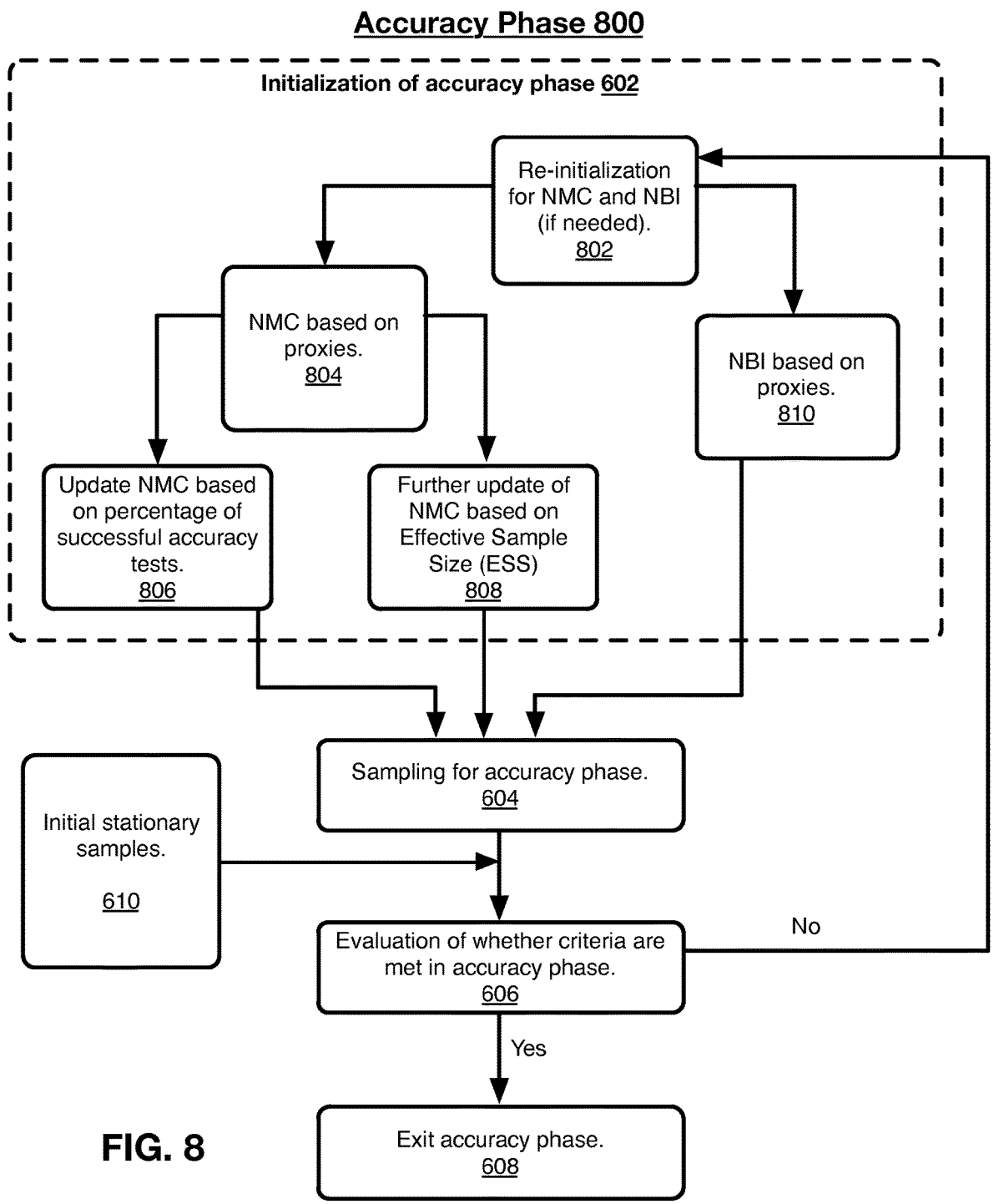
FIG. 8 illustrates an example of a logic flow representing additional details of an initialization phase of an accuracy phase.

FIG. 8 illustrates an example of a logic flow, which provides an example of an accuracy phase 800 according to an embodiment. Accuracy phase 800 may provide further detail to accuracy phase 600, described above. In particular, an initialization phase may be illustrated in more detail. At 802, a re-initialization request may be received from 606 because one or more accuracy criteria were not met during an evaluation phase. At 804, NMC may be updated based upon proxies, as described above. For example, NMC may be updated based upon a percentage of successful accuracy tests, with a higher percentage of accuracy indicating a lower increase in NMC. Further, at 808, NMC may be updated based upon an effective sample size test, in which a NMC value is compared to a sample size that is known to be effective and may lead to accurate results.

Figure 9:
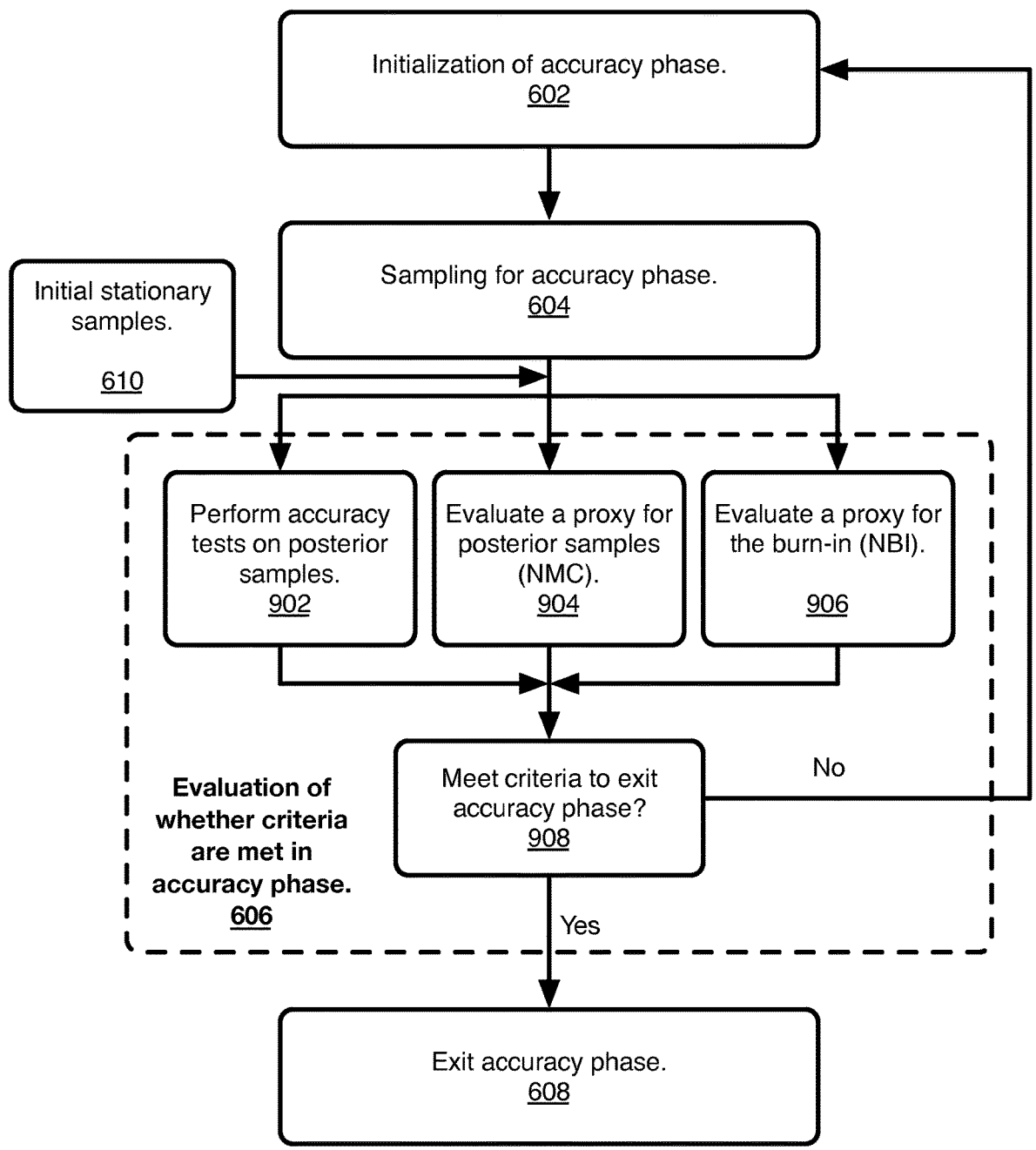
FIG. 9 illustrates an example of a logic flow representing additional details of an evaluation phase of an accuracy phase.

FIG. 9 illustrates an example of a logic flow, which provides an example of an accuracy phase 900 according to an embodiment. Accuracy phase 900 may provide further detail to accuracy phase 600, described above. In particular, an evaluation phase may be illustrated in more detail. At 902, one or more accuracy tests may be performed on posterior samples. In addition, at 904, a proxy for NMC may be evaluated. Further, at 906, a may NBI proxy determine a burn-in value.

In an embodiment, at 902, an evaluation phase may perform accuracy tests, such as determining whether the mean and some given percentiles of the posterior distribution are evaluated accurately using the Raftery-Lewis and/or Heidelberger-Welch tests. When accuracy is determined to be below a threshold amount (for example, when the Raftery-Lewis test indicates that more NMC are required, RL(NMC>0), the process may repeat and draw additional samples (NMC) from the posterior distribution at 602 and 604. The amount of additional samples may be determined by the degree of accuracy of mean and percentiles, which may be determined using the Raftery-Lewis and/or Heidelberger-Welch tests.

At 904, the Raftery-Lewis test may provide a proxy of the sample size needed to obtain an accurate analysis of a given percentile. For example, if the predicted number of samples, RL(NMC), is larger than the actual number of samples, NMC>RL(NMC), then the actual number of samples may be augmented by the Raftery-Lewis proxy, NMC=NMC+RL(NMC), until a desirable result is obtained. Another example may include an implementation of the effective sample size (ESS) test. Specifically, at each iteration of the accuracy phase, the ESS may be evaluated for the simulated samples from the posterior distribution. If the ESS is smaller than a desired level provided by the user, then module 904 may increment NMC accordingly.

At 906, the burn-in (NBI) may be evaluated. The Heidelberger-Welch test may provide a proxy for the size of the burn-in. When the predicted burn-in is not zero, NBI(HW)>0, the actual burn-in (NBI) may be increased by the corresponding amount: NBI=NBI+NBI(HW). Thus, a possible criteria for exited the stationarity phase may be that the NBI predicted by Heidelberger-Welch is zero, or some other desirable value.

At 908, based upon the results of the tests performed at 902, 904, and 906, it may be determined whether a desired level of accuracy has been reached. If so, the accuracy phase may end at 608. If not, the accuracy phase may start over at 602, as described above.

Figure 10:
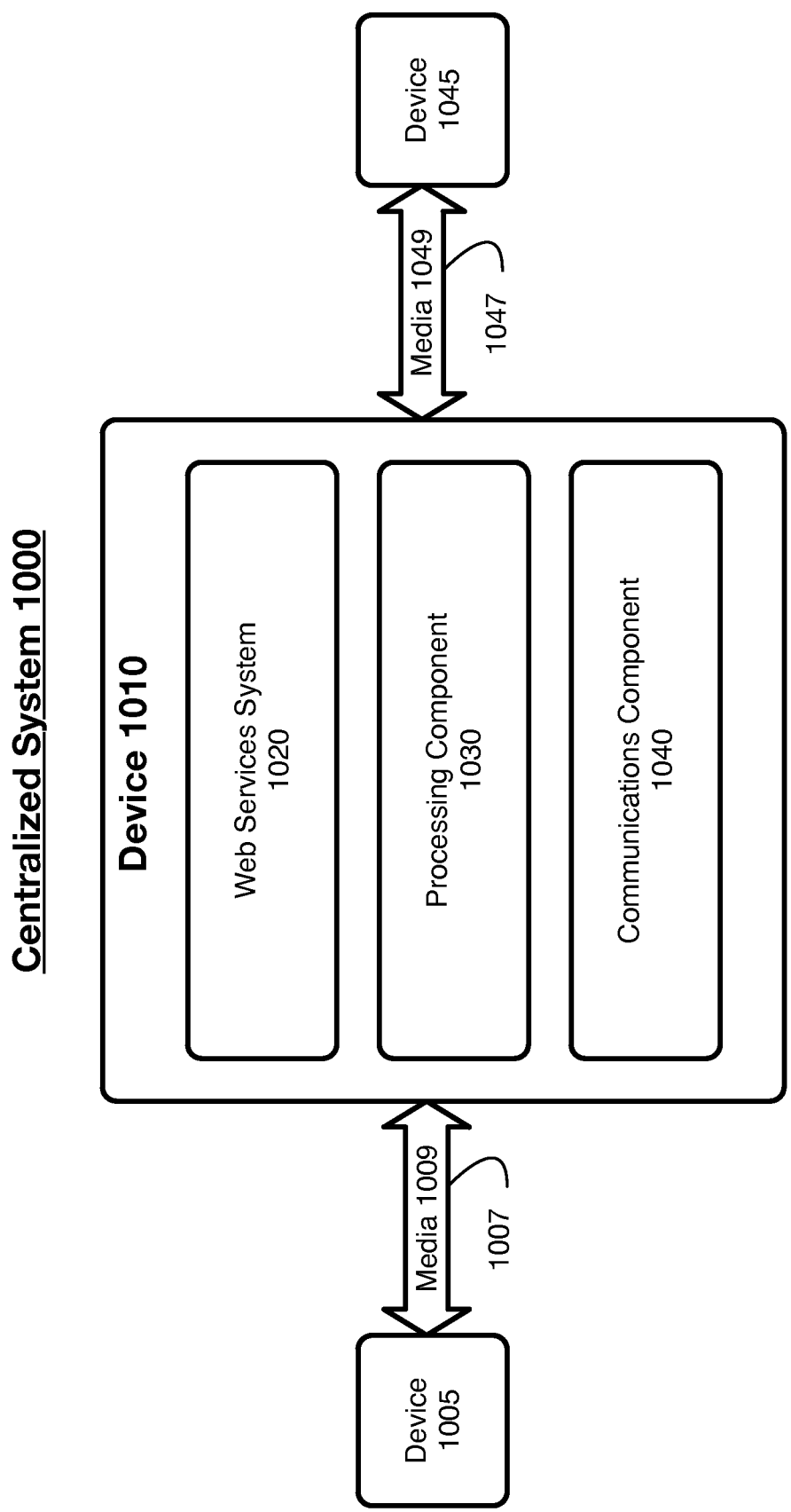
FIG. 10 illustrates an example of a centralized system.

FIG. 10 illustrates a block diagram of a centralized system 1000. The centralized system 1000 may implement some or all of the structure and/or operations for the web services system 1020 in a single computing entity, such as entirely within a single device 1010.

The device 1010 may comprise any electronic device capable of receiving, processing, and sending information for the web services system 1020. Examples of an electronic device may include without limitation a computer, a personal computer (PC), a desktop computer, a laptop computer, a notebook computer, a netbook computer, a handheld computer, a tablet computer, a server, a server array or server farm, a web server, a network server, an Internet server, a work station, a main frame computer, a supercomputer, a network appliance, a web appliance, a distributed computing system, multiprocessor systems, processor-based systems, wireless access point, base station, subscriber station, radio network controller, router, hub, gateway, bridge, switch, machine, or combination thereof. The embodiments are not limited in this context.

The device 1010 may execute processing operations or logic for the web services system 1020 using a processing component 1030. The processing component 1030 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1010 may execute communications operations or logic for the web services system 1020 using communications component 1040. The communications component 1040 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1040 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1009, 1049 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated transmission, and so forth. Examples of wireless communications media may include acoustic, radio-frequency (RF) spectrum, infrared and other wireless media.

The device 1010 may communicate with other devices 1005, 1045 over a communications media 1009, 1049, respectively, using communications transmissions 1007, 1047, respectively, via the communications component 1040. The devices 1005, 1045, may be internal or external to the device 1010 as desired for a given implementation. Examples of devices 1005, 1045 may include, but are not limited to, a mobile device, a personal digital assistant (PDA), a mobile computing device, a smart phone, a telephone, a digital telephone, a cellular telephone, ebook readers, a handset, a one-way pager, a two-way pager, a messaging device, consumer electronics, programmable consumer electronics, game devices, television, digital television, or set top box.

For example, device 1005 may correspond to a client device such as a phone used by a user. Transmissions 1007 sent over media 1009 may therefore comprise communication between the phone and the web services system 1020 in which the phone transmits a request and receives a web page in response.

Device 1045 may correspond to a second user device used by a different user from the first user, described above. In one embodiment, device 1045 may submit information to the web services system 1020 using transmissions 1047 sent over media 1049 to construct an invitation to the first user to join the services offered by web services system 1020. For example, if web services system 1020 comprises a social networking service, the information sent as transmissions 1047 may include a name and contact information for the first user, the contact information including phone number or other information used later by the web services system 1020 to recognize an incoming request from the user. In other embodiments, device 1045 may correspond to a device used by a different user that is a friend of the first user on a social networking service, the transmissions 1047 including status information, news, images, or other social-networking information that is eventually transmitted to device 1005 for viewing by the first user as part of the social networking functionality of the web services system 1020.

Figure 11:
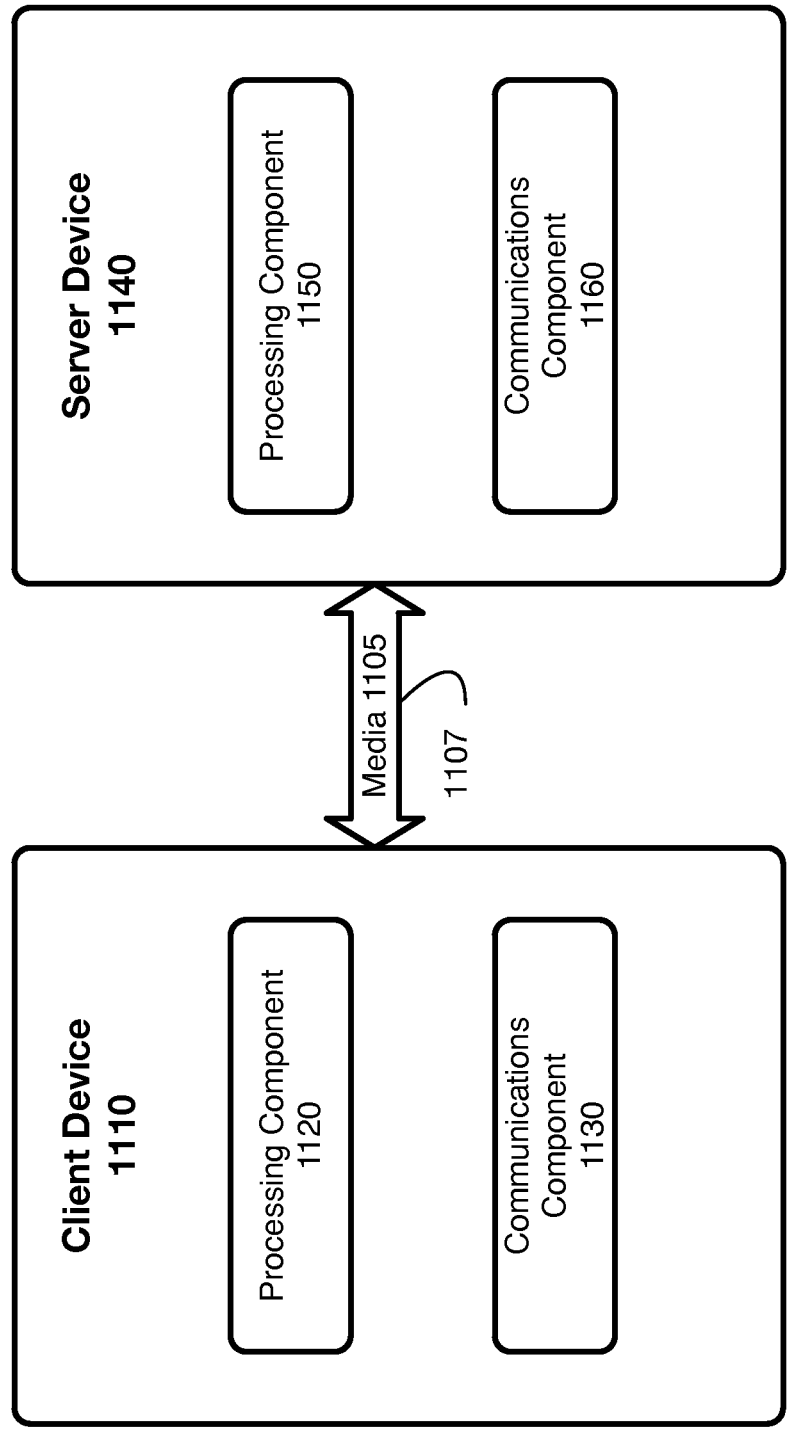
FIG. 11 illustrates an example of a distributed system.

FIG. 11 illustrates an example of a distributed system 1100. The distributed system 1100 may distribute portions of the structure and/or operations for the disclosed embodiments across multiple computing entities. Examples of distributed system 1100 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1100 may comprise a client device 1110 and a server device 1140. In general, the client device 1110 and the server device 1140 may be the same or similar to the client device 1010 as described with reference to FIG. 10. For instance, the client device 1110 and the server system 11400 may each comprise a processing component 1120, 1150 and a communications component 1130, 1160 which are the same or similar to the processing component 1030 and the communications component 1040, respectively, as described with reference to FIG. 10. In another example, the devices 1110, 1140 may communicate over a communications media 1105 using communications transmissions 1107 via the communications components 1130, 1160.

The client device 1110 may comprise or employ one or more client programs that operate to perform various methodologies in accordance with the described embodiments. In one embodiment, for example, the client device 1110 may implement some steps described with respect to FIGS. 2-9.

The server device 1140 may comprise or employ one or more server programs that operate to perform various methodologies in accordance with the described embodiments. In one embodiment, for example, the server device 1140 may implement some steps described with respect to FIGS. 2-9.

Figure 12:
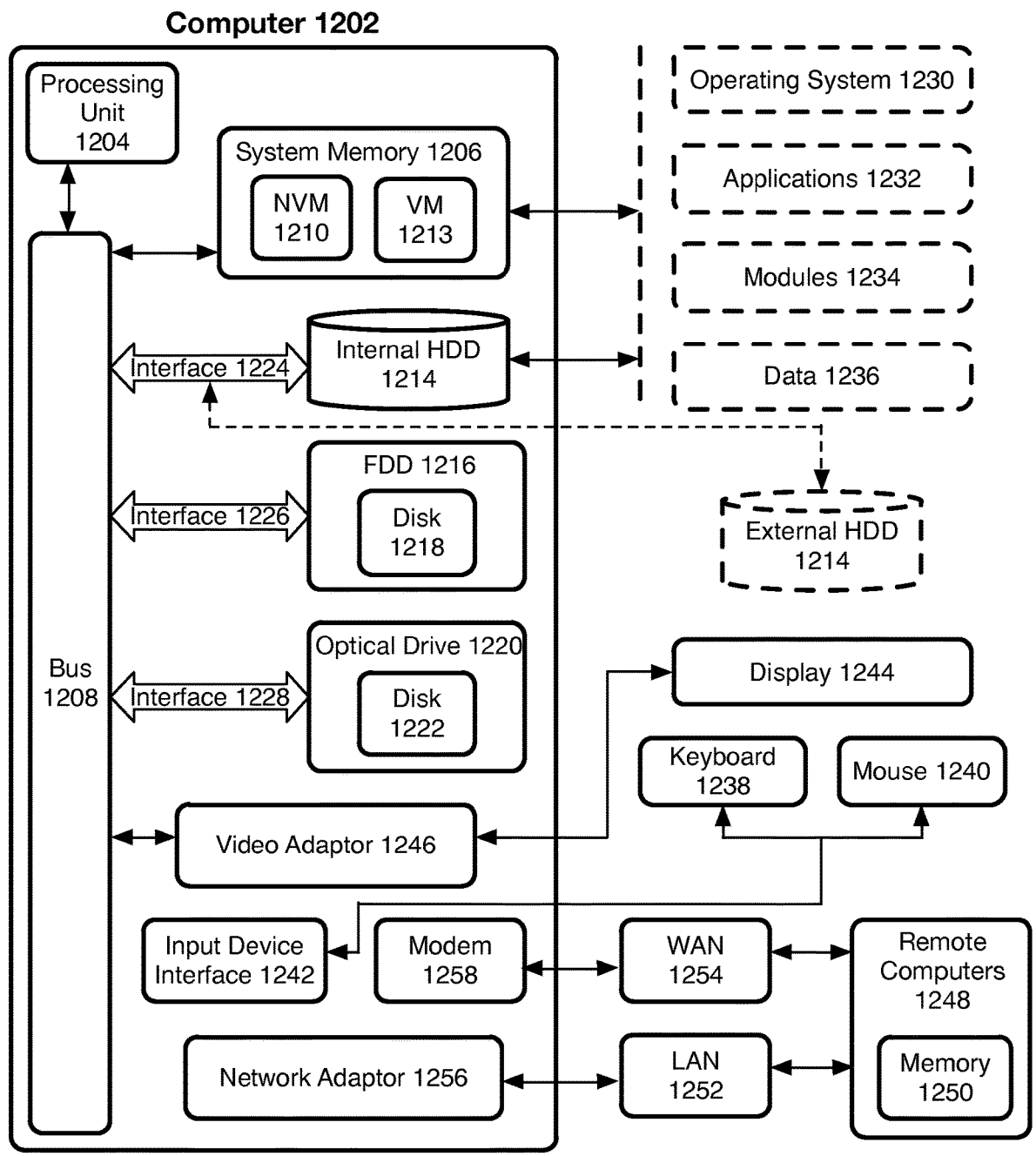
FIG. 12 illustrates an example of a computing architecture.

FIG. 12 illustrates an embodiment of an exemplary computing architecture 1200 suitable for implementing various embodiments as previously described. In one embodiment, the computing architecture 1200 may comprise or be implemented as part of an electronic device. Examples of an electronic device may include those described herein. The embodiments are not limited in this context.

As used in this application, the terms "system" and "component" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of transmissions communicated over the communications media. The information can be implemented as transmissions allocated to various transmission lines. In such allocations, each message is a transmission. Further embodiments, however, may alternatively employ data messages. Such data messages may be sent across various connections. Exemplary connections include parallel interfaces, serial interfaces, and bus interfaces.

The computing architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1200.

As shown in FIG. 12, the computing architecture 1200 comprises a processing unit 1204, a system memory 1206 and a system bus 1208. The processing unit 1204 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1204.

The system bus 1208 provides an interface for system components including, but not limited to, the system memory 1206 to the processing unit 1204. The system bus 1208 can be any of several types of bus structure that may further interconnect to a memory bus (with or without a memory controller), a peripheral bus, and a local bus using any of a variety of commercially available bus architectures. Interface adapters may connect to the system bus 1208 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1200 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 1206 can include non-volatile memory 1210 and/or volatile memory 1213. A basic input/output system (BIOS) can be stored in the non-volatile memory 1210.

The computer 1202 may include various types of computer-readable storage media in the form of one or more lower speed memory units, including an internal (or external) hard disk drive (HDD) 1214, a magnetic floppy disk drive (FDD) 1216 to read from or write to a removable magnetic disk 1218, and an optical disk drive 1220 to read from or write to a removable optical disk 1222 (e.g., a CD-ROM, DVD, or Blu-ray). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1210, 1213, including an operating system 1230, one or more application programs 1232, other program modules 1234, and program data 1236. In one embodiment, the one or more application programs 1232, other program modules 1234, and program data 1236 can include, for example, the various applications and/or components to implement the disclosed embodiments.

A user can enter commands and information into the computer 1202 through one or more wire/wireless input devices, for example, a keyboard 1238 and a pointing device, such as a mouse 1240. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1204 through an input device interface 1242 that is coupled to the system bus 1208, but can be connected by other interfaces such as a parallel port, IEEE 1394 serial port, a game port, a USB port, an IR interface, and so forth.

A display 1244 is also connected to the system bus 1208 via an interface, such as a video adaptor 1246. The display 1244 may be internal or external to the computer 1202. In addition to the display 1244, a computer typically includes other peripheral output devices, such as speakers, printers, and so forth.

The computer 1202 may operate in a networked environment using logical connections via wire and/or wireless communications to one or more remote computers, such as a remote computer 1248. The remote computer 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, connects to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

FIG. 13 illustrates a block diagram of an exemplary communications architecture 1300 suitable for implementing various embodiments as previously described. The communications architecture 1300 includes various common communications elements, such as a transmitter, receiver, transceiver, radio, network interface, baseband processor, antenna, amplifiers, filters, power supplies, and so forth. The embodiments, however, are not limited to implementation by the communications architecture 1300.

As shown in FIG. 13, the communications architecture 1300 comprises includes one or more clients 1310 and servers 1340. The clients 1310 may implement the client device 1110, for example. The servers 1340 may implement the server device 1140, for example. The clients 1310 and the servers 1340 are operatively connected to one or more respective client data stores 1320 and server data stores 1350 that can be employed to store information local to the respective clients 1310 and servers 1340, such as cookies and/or associated contextual information.

The clients 1310 and the servers 1340 may communicate information between each other using a communication framework 1330. The communications framework 1330 may implement any well-known communications techniques and protocols. The communications framework 1330 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1330 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1310 and the servers 1340. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop®, for example, is an open-source software framework for distributed computing.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical transmissions capable of being stored, transferred, combined, compared, and otherwise manipulated. It proves convenient at times, principally for reasons of common usage, to refer to these transmissions as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given. In some embodiments, MCMC simulation methods may accept one or more initialization parameters, which may affect the stationarity or accuracy of distribution samples.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible.

The invention claimed is:

1. A computer-implemented method, comprising:
   randomly generating, in a stationarity phase at a coordinating device of a distributed system, and from a multiple mode posterior distribution, multiple starting points at which to start generation of multiple chains of the posterior distribution, wherein:
     each starting point corresponds to a different local portion of the posterior distribution;
     each chain of the multiple chains comprises a plurality of posterior samples; and
     at least two chains of the multiple chains converge to different modes of the multiple modes;
   transmitting, from the coordinating device, and via a network to each node device of multiple node devices of the distributed system, a different starting point of the multiple starting points at which each node device is to begin the generation of a chain of the multiple chains;
   transmitting, from the coordinating device, and via the network to each node device, one or more values to enable the generation of a chain of the multiple chains by each node device, wherein:
     the one or more values comprises a number of tuning samples, a number of posterior samples and a number of burn-in;
     each node device performs sampling in the stationarity phase, based on the one or more values, to generate a chain of the multiple chains that starts at the starting point received by the node device from the coordinating device;
     each node device evaluates the plurality of posterior samples of the chain generated at the node device to determine whether one or more stationarity criteria are met;
     each node device, in response to a determination that the plurality of posterior samples of the chain generated at the node device does not meet the one or more stationarity criteria, performs operations comprising:
       increase the number of tuning samples of the chain generated at the node based on a percentage of successful stationarity tests of the plurality of posterior samples; and
       increase the number of posterior samples of the chain generated at the node to a proxy of the number of posterior samples; and each node device, in response to a determination that the plurality of posterior samples of the chain generated at the node device meets the one or more stationarity criteria such that local stationarity is achieved, transmits the number of posterior samples in the chain generated at the node device to the coordinating device via the network;

receiving, at the coordinating device and via the network, the number of posterior samples generated in a chain of the multiple chains by each node device;

determining, at the coordinating device, a largest number of posterior samples generated in any chain of the multiple chains; and transmitting, from the coordinating device, and via the network to the multiple node devices, the largest number of posterior samples generated in any chain of the multiple chains to enable at least one node device of the multiple node devices to resample the plurality of posterior samples of at least one chain to normalize the number of posterior samples across the multiple chains to complete the stationarity phase.

2. The computer-implemented method of claim 1, further comprising initializing the number of tuning samples, the number of posterior samples, and the number of burn-in.

3. The computer-implemented method of claim 1, further comprising:
identifying multiple proposal distributions associated with the posterior distribution; and
transmitting, from the coordinating device, and via the network to each node device, a different proposal distribution of the multiple proposal distributions to enable each node device to generate the plurality of posterior samples of the chain generated by the node device from the proposal distribution received by the node device from the coordinating device using a Markov Chain Monte Carlo (MCMC) algorithm.

4. The computer-implemented method of claim 1, wherein the evaluation of the plurality of samples includes:
each node device evaluating the plurality of posterior samples of the chain generated by the node device using one or more stationarity tests; and
each node device evaluating a burn-in proxy.

5. The computer-implemented method of claim 1, further comprising initializing, at the coordinating device, the number of burn-in based upon one or more proxies.

6. The computer-implemented method of claim 1, further comprising initializing, at the coordinating device the number of tuning samples, the number of posterior samples, and the number of burn-in based upon user-provided values or default values.

7. The computer-implemented method of claim 1, wherein wherein each node device performs operations comprising:
performing one or more stationarity tests on the plurality of posterior samples of the chain generated by the node device;
evaluating one or more proxies for the plurality of posterior samples; and
evaluating one or more proxies for a burn-in.

8. The computer-implemented method of claim 7, wherein:
each node device evaluates whether the one or more stationarity criteria have been met by the one or more stationarity tests, the evaluation of one or more proxies for the plurality of posterior samples of the chain generated by the node device, and the evaluation of one or more proxies for the burn-in; and when each node device determines that the one or more stationarity criteria have been met with the plurality of samples of the chain generated by the node device, each node device transmits the plurality of samples, via the network, to the coordinating device.

9. The computer-implemented method of claim 7, wherein each node device generates the plurality of samples of the chain generated by the node device from the posterior distribution using a Markov Chain Monte Carlo (MCMC) algorithm.

10. An article of manufacture comprising a non-transitory computer-readable storage medium comprising instructions that, when executed, cause a coordinating device of a distributed system to:
randomly generate, in a stationarity phase at the coordinating device, and from a multiple mode posterior distribution, multiple starting points at which to start generation of multiple chains of the posterior distribution, wherein:
each starting point corresponds to a different local portion of the posterior distribution;
each chain of the multiple chains comprises a plurality of posterior samples; and
at least two chains of the multiple chains converge to different modes of the multiple modes;
transmit, from the coordinating device, and via a network to each node device of multiple node devices of the distributed system, a different starting point of the multiple starting points at which each node device is to begin the generation of a chain of the multiple chains;
transmit, from the coordinating device, and via the network to each node device, one or more values to enable the generation of a chain of the multiple chains by each node device, wherein:
the one or more values comprises a number of tuning samples, a number of posterior samples and a number of burn-in;
each node device performs sampling in the stationarity phase, based on the one or more values, to generate a chain of the multiple chains that starts at the starting point received by the node device from the coordinating device;
each node device evaluates the plurality of posterior samples of the chain generated at the node device to determine whether one or more stationarity criteria are met;
each node device, in response to a determination that the plurality of posterior samples of the chain generated at the node device does not meet the one or more stationarity criteria, performs operations comprising:
increase the number of tuning samples of the chain generated at the node based on a percentage of successful stationarity tests of the plurality of posterior samples; and
increase the number of posterior samples of the chain generated at the node to a proxy of the number of posterior samples; and
each node device, in response to a determination that the plurality of posterior samples of the chain generated at the node device meets the one or more stationarity criteria such that local stationarity is achieved, transmits the number of posterior samples in the chain generated at the node device to the coordinating device via the network;

receive, at the coordinating device and via the network, the number of posterior samples generated in a chain of the multiple chains by each node device;

determine, at the coordinating device, a largest number of posterior samples generated in any chain of the multiple chains; and transmit, from the coordinating device, and via the network to the multiple node devices, the largest number of posterior samples generated in any chain of the multiple chains to enable at least one node device of the multiple node devices to resample the plurality of posterior samples of at least one chain to normalize the number of posterior samples across the multiple chains to complete the stationarity phase.

11. The article of claim 10, further comprising instructions that, when executed, cause the coordinating device to initialize the number of tuning samples, the number of posterior samples, and the number of burn-in.

12. The article of claim 10, further comprising instructions that, when executed, cause the coordinating device to:
identify multiple proposal distributions associated with the posterior distribution; and
transmit, from the coordinating device, and via the network to each node device, a different proposal distribution of the multiple proposal distributions to enable each node device to generate the plurality of posterior samples of the chain generated by the node device from the proposal distribution received by the node device from the coordinating device using a Markov Chain Monte Carlo (MCMC) algorithm.

13. The article of claim 10, wherein, during the evaluation of the plurality of posterior samples, each node device evaluates the plurality of posterior samples of the chain generated by the node device using one or more stationarity tests and evaluates a burn-in proxy.

14. The article of claim 10, further comprising instructions that, when executed, cause the coordinating device to initialize the number of burn-in based upon one or more proxies.

15. The article of claim 10, further comprising instructions that, when executed, cause the coordinating device to initialize the number of tuning samples, the number of posterior samples, and the number of burn-in based upon user-provided values or default values.

16. The article of claim 10, wherein each node device performs operations comprising:
perform one or more stationarity tests on the plurality of posterior samples of the chain generated by the node device;
evaluate one or more proxies for the plurality of posterior samples; and
evaluate one or more proxies for a burn-in.

17. The article of claim 16, wherein:
each node device evaluates whether the one or more stationarity criteria have been met by the one or more stationarity tests, the evaluation of one or more proxies for the plurality of posterior samples of the chain generated by the node device, and the evaluation of one or more proxies for the burn-in; and
when each node device determines that the one or more stationarity criteria have been met with the plurality of posterior samples of the chain generated by the node device, each node device transmits the plurality of samples, via the network, to the coordinating device.

18. The article of claim 16, wherein each node device generates the plurality of samples of the chain generated by the node device from the posterior distribution using a Markov Chain Monte Carlo (MCMC) algorithm.

19. An apparatus, comprising a processor and a storage to store instructions that, when executed by the processor, cause the processor to perform operations comprising:
randomly generate, in a stationarity phase by the processor, and from a multiple mode posterior distribution, multiple starting points at which to start generation of multiple chains of the posterior distribution, wherein:
each starting point corresponds to a different local portion of the posterior distribution;
each chain of the multiple chains comprises a plurality of posterior samples; and
at least two chains of the multiple chains converge to different modes of the multiple modes;
transmit, by the processor, and via a network to each node device of multiple node devices of the distributed system, a different starting point of the multiple starting points at which each node device is to begin the generation of a chain of the multiple chains;
transmit, by the processor, and via the network to each node device, one or more values to enable the generation of a chain of the multiple chains by each node device, wherein:
the one or more values comprises a number of tuning samples, a number of posterior samples and a number of burn-in;
each node device performs sampling in the stationarity phase, based on the one or more values, to generate a chain of the multiple chains that starts at the starting point received by the node device from the coordinating device;
each node device evaluates the plurality of posterior samples of the chain generated at the node device to determine whether one or more stationarity criteria are met;
each node device, in response to a determination that the plurality of posterior samples of the chain generated at the node device does not meet the one or more stationarity criteria, performs operations comprising:
increase the number of tuning samples of the chain generated at the node based on a percentage of successful stationarity tests of the plurality of posterior samples; and
increase the number of posterior samples of the chain generated at the node to a proxy of the number of posterior samples; and
each node device, in response to a determination that the plurality of posterior samples of the chain generated at the node device meets the one or more stationarity criteria such that local stationarity is achieved, transmits the number of posterior samples in the chain generated at the node device to the coordinating device via the network;
receive, at the processor and via the network, the number of posterior samples generated in a chain of the multiple chains by each node device;
determine, by the processor, a largest number of posterior samples generated in any chain of the multiple chains; and
transmit, by the processor, and via the network to the multiple node devices, the largest number of posterior samples generated in any chain of the multiple chains to enable at least one node device of the multiple node devices to resample the plurality of posterior samples of at least one chain to normalize the number of posterior samples across the multiple chains to complete the stationarity phase.

20. The apparatus of claim 19, wherein the processor is caused to initialize the number of tuning samples, the number of posterior samples, and the number of burn-in.

21. The apparatus of claim 19, wherein the processor is caused to:
identify multiple proposal distribution associated with the posterior distribution; and
transmit, by the processor, and via the network to each node device, a different proposal distribution of the multiple proposal distributions to enable each node device to generate the plurality of posterior samples of the chain generated by the node device from the proposal distribution received by the node device from the processor using a Markov Chain Monte Carlo (MCMC) algorithm.

22. The apparatus of claim 19, wherein, during the evaluation of the plurality of samples, each node device evaluates the plurality of posterior samples of the chain generated by the node device using one or more stationarity tests and evaluates a burn-in proxy.

23. The apparatus of claim 19, wherein the processor is caused to initialize the number of burn-in based upon one or more proxies.

24. The apparatus of claim 19, wherein the processor is caused to initialize the number of tuning samples, the number of posterior samples, and the number of burn-in based upon user-provided values or default values.

25. The apparatus of claim 19, wherein each node device performs operations comprising:
perform one or more stationarity tests on the plurality of posterior samples of the chain generated by the node device;
evaluate one or more proxies for the plurality of posterior samples; and
evaluate one or more proxies for a burn-in.

26. The apparatus of claim 25, wherein:
each node device evaluates whether the one or more stationarity criteria have been met by the one or more stationarity tests, the evaluation of one or more proxies for the plurality of posterior samples of the chain generated by the node device, and the evaluation of one or more proxies for the burn-in; and
when each node device determines that the one or more stationarity criteria have been met with the plurality of posterior samples of the chain generated by the node device, each node device transmits the plurality of samples, via the network, to the processor.

27. The apparatus of claim 25, wherein each node device generates the plurality of samples of the chain generated by the node device from the posterior distribution using a Markov Chain Monte Carlo (MCMC) algorithm.

* * * * *